United States Patent [19]

Hochstein et al.

[11] Patent Number: 5,543,797
[45] Date of Patent: *Aug. 6, 1996

[54] SUPERVISED PERSONNEL MONITORING SYSTEM

[75] Inventors: Peter A. Hochstein, Troy; Jeffrey Tenenbaum, West Bloomfield; Thomas G. Xydis, Ann Arbor, all of Mich.

[73] Assignee: Audio Alert, Inc., Farmington Hills, Mich.

[*] Notice: The term of this patent shall not extend beyond the expiration date of Pat. No. 5,311,185.

[21] Appl. No.: 234,477

[22] Filed: Apr. 28, 1994

Related U.S. Application Data

[63] Continuation-in-part of Ser. No. 938,423, Aug. 31, 1992, Pat. No. 5,311,185.
[51] Int. Cl.⁶ ............................................. G01S 13/74
[52] U.S. Cl. ................... 342/42; 342/44; 342/50; 340/825.34; 340/825.54
[58] Field of Search ................... 342/42, 44, 50; 340/825.34, 825.54

[56] References Cited

U.S. PATENT DOCUMENTS 3,419,865  12/1968  Chisholm ......................... 342/457
4,494,119  1/1985   Wimbush ......................... 342/457
4,549,169  10/1985  Moura ............................. 340/539
5,311,185  5/1994   Hochstein et al. ................ 342/44
5,406,275  4/1995   Hassett et al. .................. 340/933

Primary Examiner—John B. Sotomayor
Attorney, Agent, or Firm—Reising, Ethington, Barnard & Perry

[57] ABSTRACT

The monitoring assembly (10) monitors the location of mobile objects (12), i.e., personnel, within a structure (18). The object (12) carries a transponder (14) which periodically transmits status signals and receives command signals. Transceivers (16) are fixed at locations about the structure (18) for receiving the status signal producing the location signals, and transmitting commands to the transponders. The transmissions and reception occur during prescribed time windows. A central controller (20) is connected to each transceiver (16) and monitors the location of transponders (14) and communication therethrough. The transponders (14) have audio capability of producing audio messages directly to the person thereof, especially during emergency conditions for assistance. The controller (20) transmits synchronizing signals to the transceivers (16), which in turn synchronize themselves and transmit the synchronizing signal to the transponders (14) for synchronizing.

36 Claims, 24 Drawing Sheets

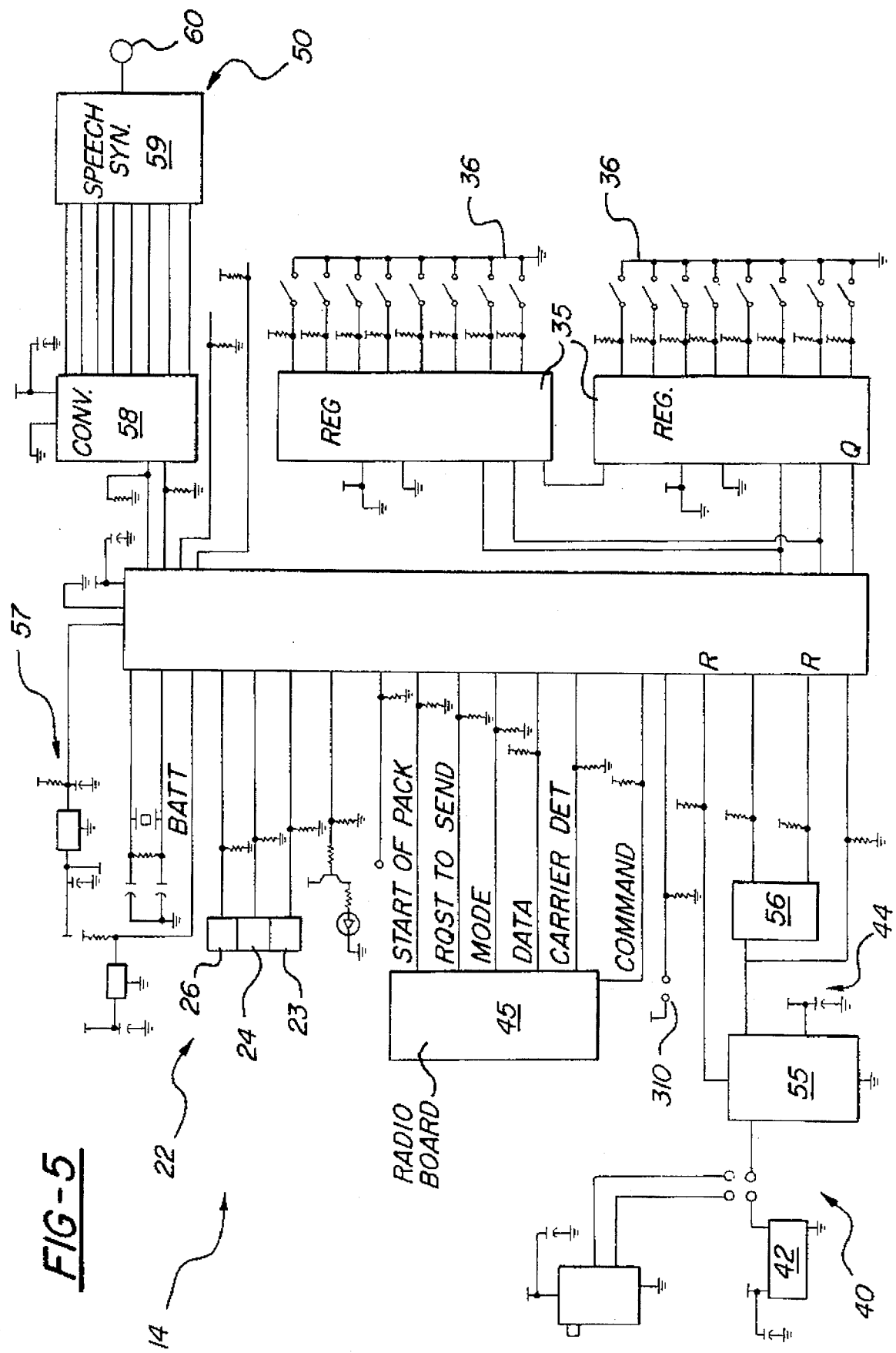

SUPERVISED PERSONNEL MONITORING SYSTEM

This is a continuation-in-part of application Ser. No. 07/938,423 filed on Aug. 31, 1992 now U.S. Pat. No. 5,311,185.

TECHNICAL FIELD

The invention relates to a security monitoring system, and more particularly to a system for monitoring mobile objects or personnel within a structure and determining distress and location thereof.

BACKGROUND OF THE INVENTION

Several security or location systems are available on the market which provide determination of the location of a person in response to a distress signal. However, none of the references provided all of the requirements for adaption to a secure building, such as a prison.

U.S. Pat. No. 4,494,119 issued Jan. 15, 1985 in the name of Wimbush discloses a distress radio location method and system which utilizes a plurality of receivers in order to determine the location of the transmitter based on signal strength of the transmitted signal. The receivers report the signal strength of the transmitted signal to a central station which in turn calculates the transmitter's location based on the measured signal strengths and the known locations of the receivers and dispatched a rescue unit thereto. The signals may be encoded to identify the transmitter.

U.S. Pat. No. 4,549,169, issued Oct. 22, 1985 in the name of Moura et al discloses a security system wherein a transmitter is located on the body of a person for continuously transmitting a signal wherein when the person falls into the water such transmission is stopped. A low battery condition is also transmitted by the transmitted signal. A cradle is used to recharge and synchronize the timer. The code is transmitted within a predetermined time slot which is associated with the particular unit. Therefore, the monitor, upon receiving no transmission during a particular time slot, is able to determine that such unit is not properly functioning and distress condition exist.

U.S. Pat. No. 3,419,865, issued Dec. 31, 1968 in the name of Chisholm discloses a mobile emergency unit locating system wherein receivers are all synchronized to a common clock and are located on vehicles. Each vehicle or unit includes a pulse transmitter and clock to actuate a transmitter during a unique time slot. Receivers deliver information to a central comparator to determine difference to times of arrivals of the same pulse signal to compute the position of the transmitter. The receivers are periodically resynchronized by a master signal. The transmitter transmits groups of coded pulses.

SUMMARY OF THE INVENTION AND ADVANTAGES

The invention is directed toward communication system which includes a plurality of transponder means for transmitting a data signal at a first predefined time and receiving a command signal containing information and a sync signal. Transceiver means is included for receiving the data signal and for producing an information signal indicative of the transponder means transmitting the data signal at a second predefined time. Central controller means is included for receiving the information signal at a third predefined time and for identifying transponder means and location of the transceiver means based. The central controller means includes synchronizing means for producing a synchronization signal and for selectively transmitting the synchronization signal to the transceivers for synchronization thereof of the predefined times.

The invention also includes monitoring system comprising the plurality of transponder means for transmitting a data signal including an emergency condition and the transceiver means for receiving the data signal and identifying which of the plurality of transponder means is transmitting. Each of the transponder means includes timing means for establishing cycles of sequential time ranges wherein each time range is associated with each of the transponder means and occurs at least once during each cycle, the data signal being transmitted during the time range associated with a respective transponder means. The transponder means includes emergency means for transmitting the data signal with emergency condition during any of the time ranges.

The invention further includes the transponder means transmitting a data signal and receiving a command signal and the transceiver means receiving the data signal and producing an information signal indicative of the transponder means which is transmitting. The central controller means receives the information signal and identifies the location of transponder means, and detects an emergency condition from data signal and automatically notifies by transmission of command signal a selected transponder means the occurrence of the emergency signal.

The invention also includes the controller means receiving the information signal and displaying the location of the transponder means. The controller means includes means for selecting less than all of the transceiver means and for transmitting the command signal to less than all of the transceiver means for subsequent transmission for reception by the transponder means.

The invention includes the transponder means and the transceiver means including radio frequency transmitters for communicating the data signal and the command signal therebetween.

FIGURES IN THE DRAWINGS

Advantages of the present invention will be readily appreciated as the same becomes better understood by reference to the following detailed description when considered in connection with the accompanying drawings wherein:

FIG. 5 is a circuit diagram of the transponders;

Figure 12A:
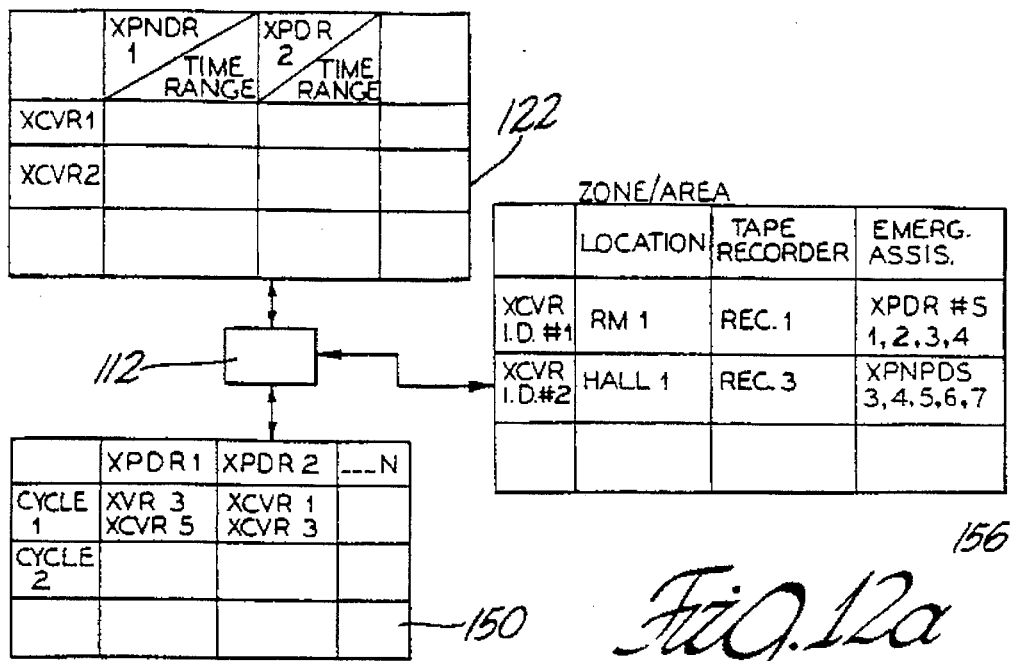
Figure 12B:
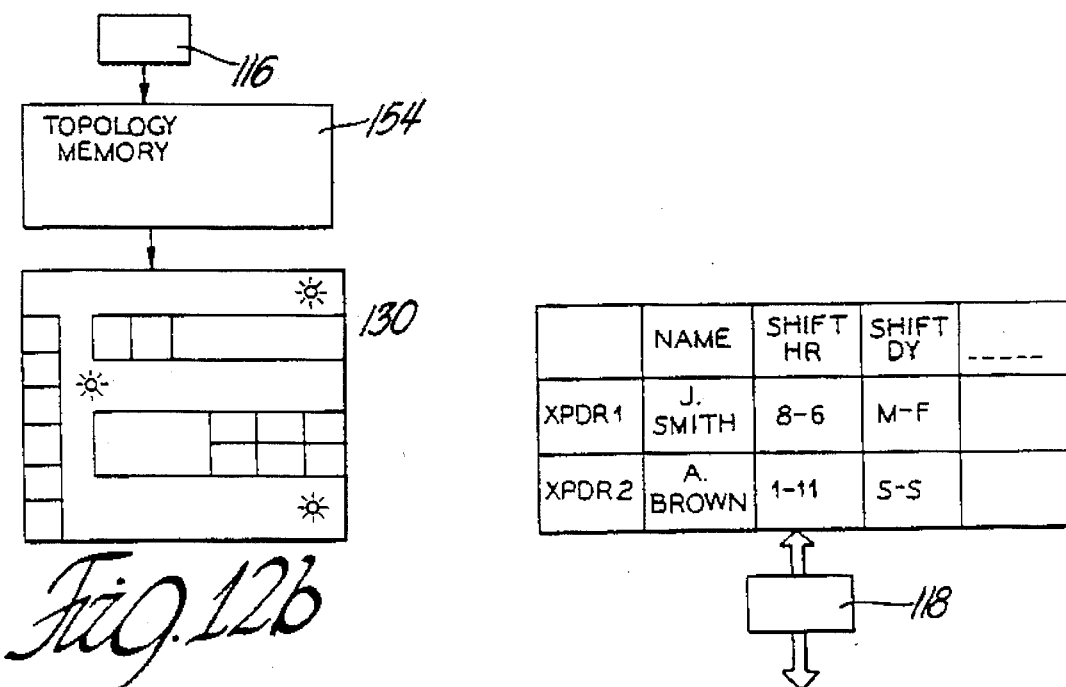
Figure 12C:
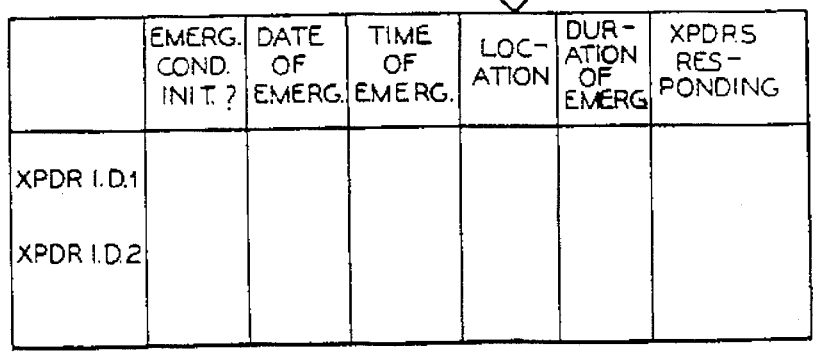
Figure 13A:
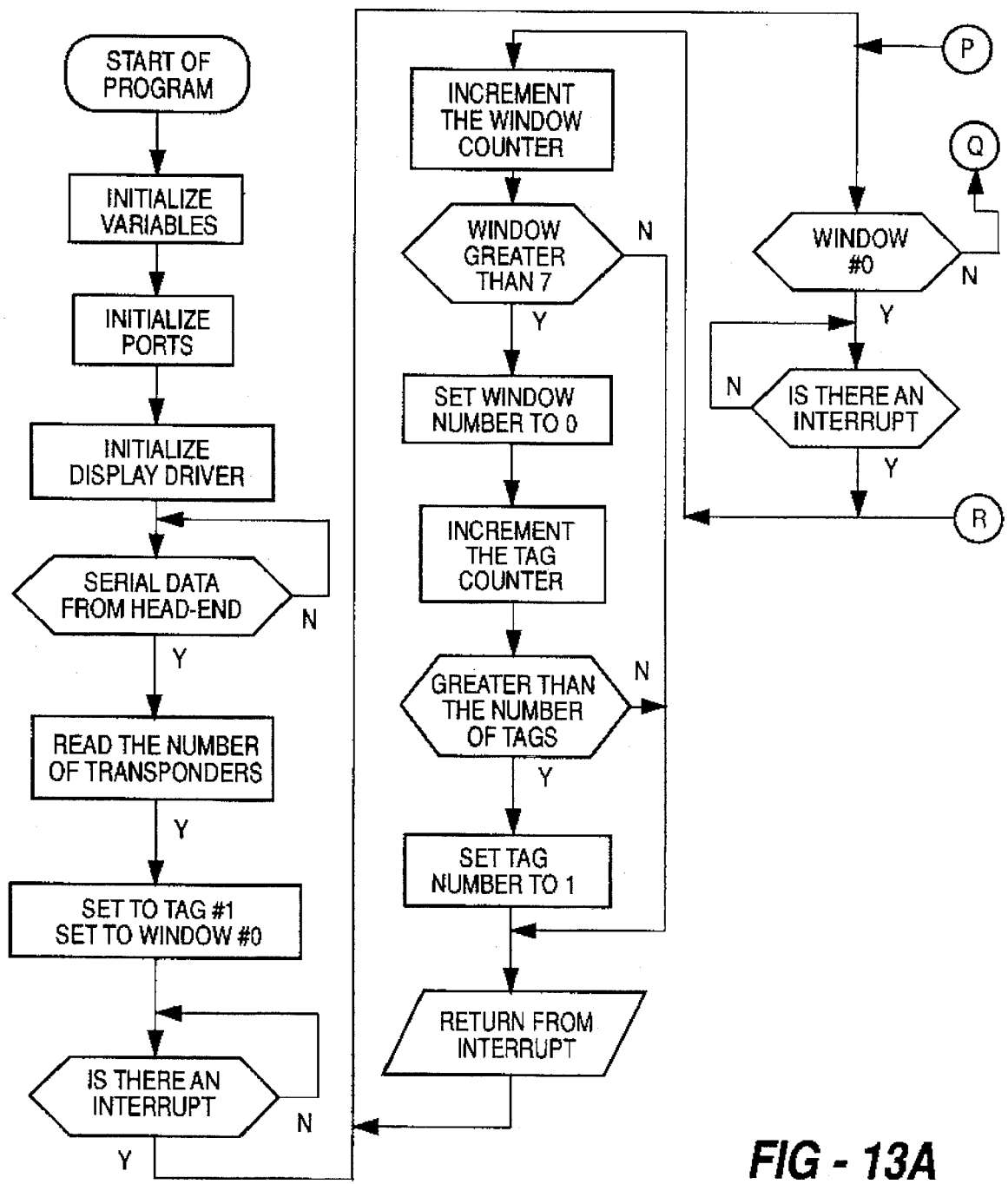
Figure 13B:
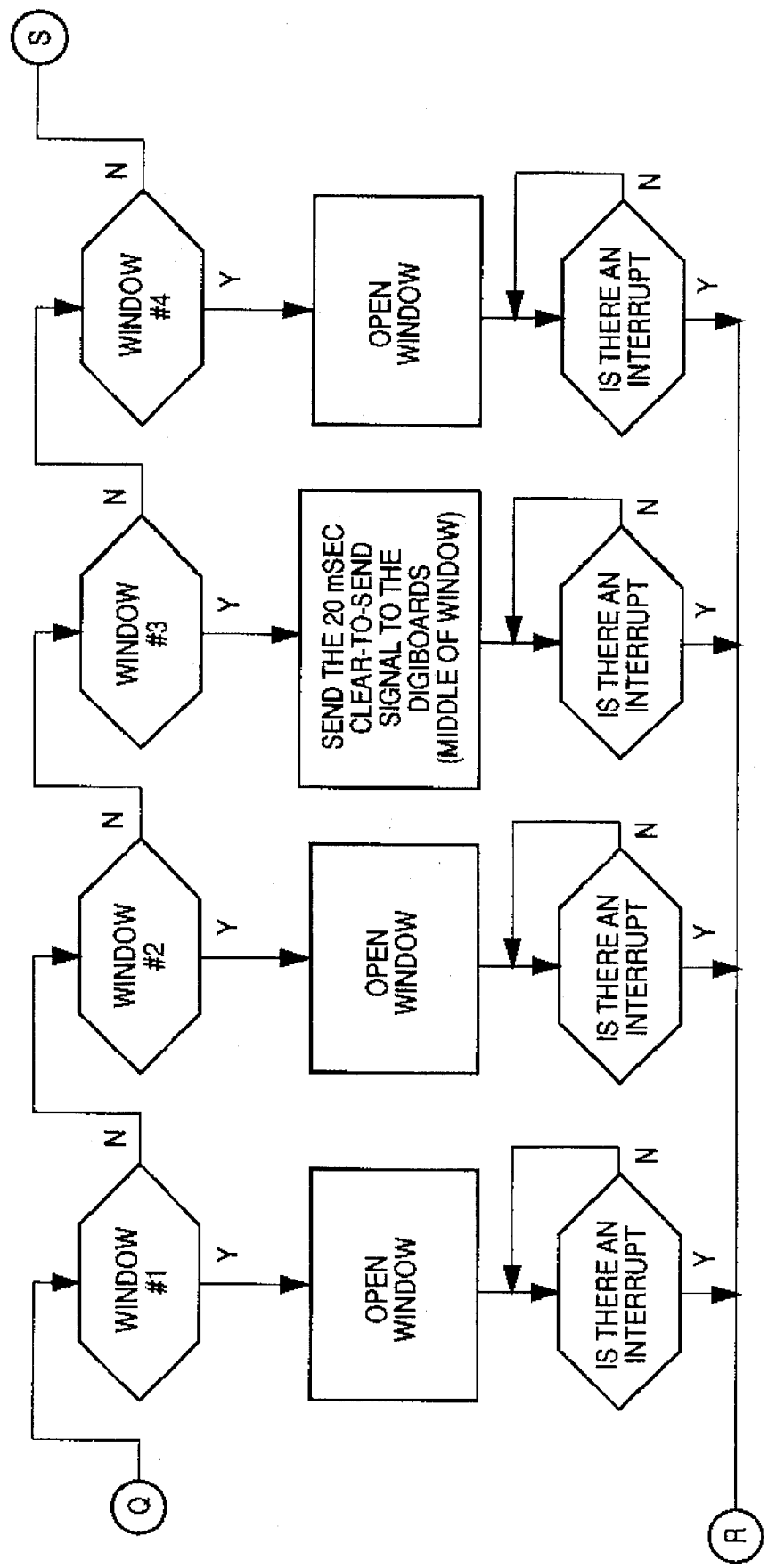
Figure 13C:
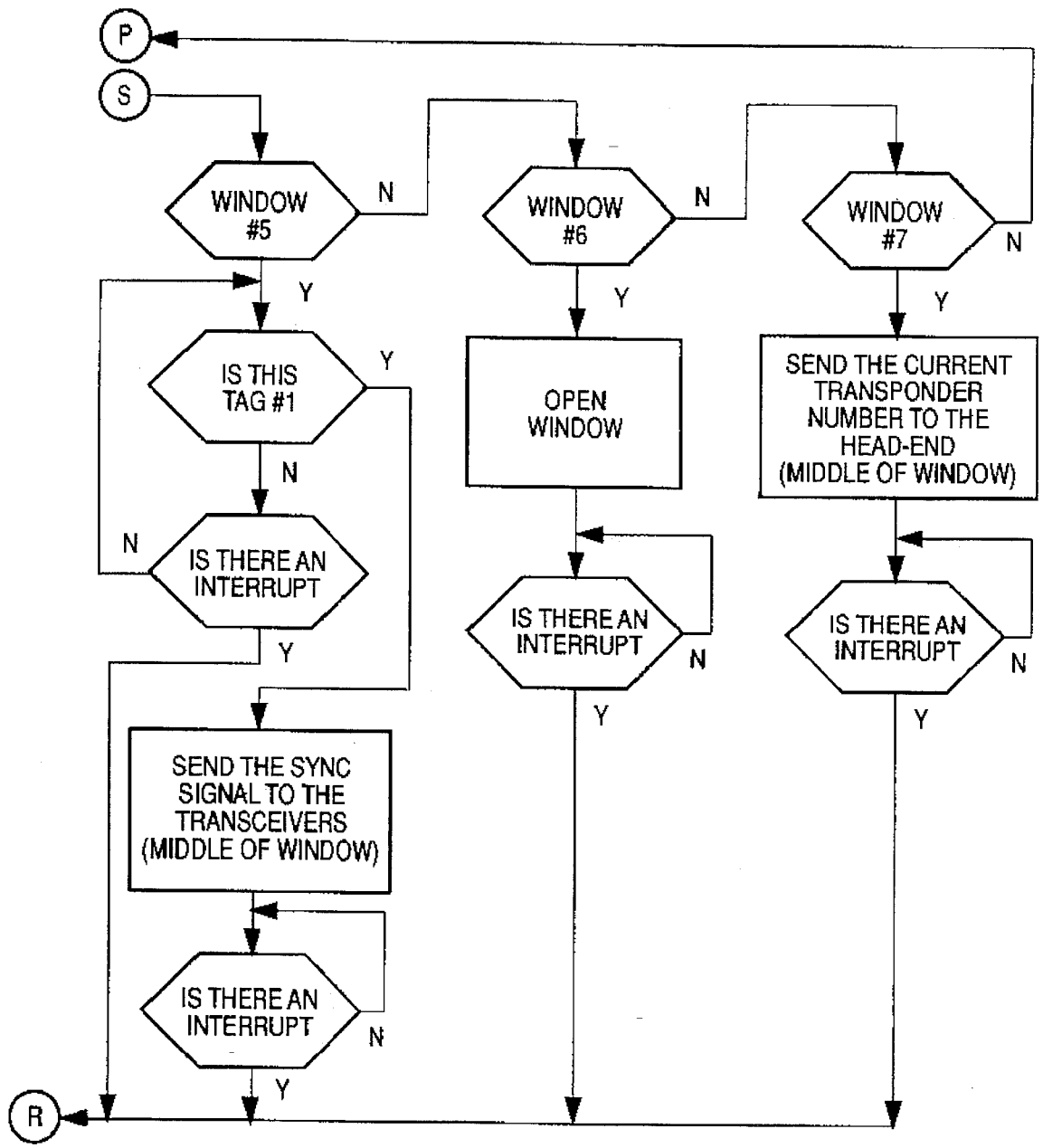

FIGS. 12a–c illustrate the memories of the control means;

FIG. 13 is a flow chart of the synchronizer; and

Figure 14:
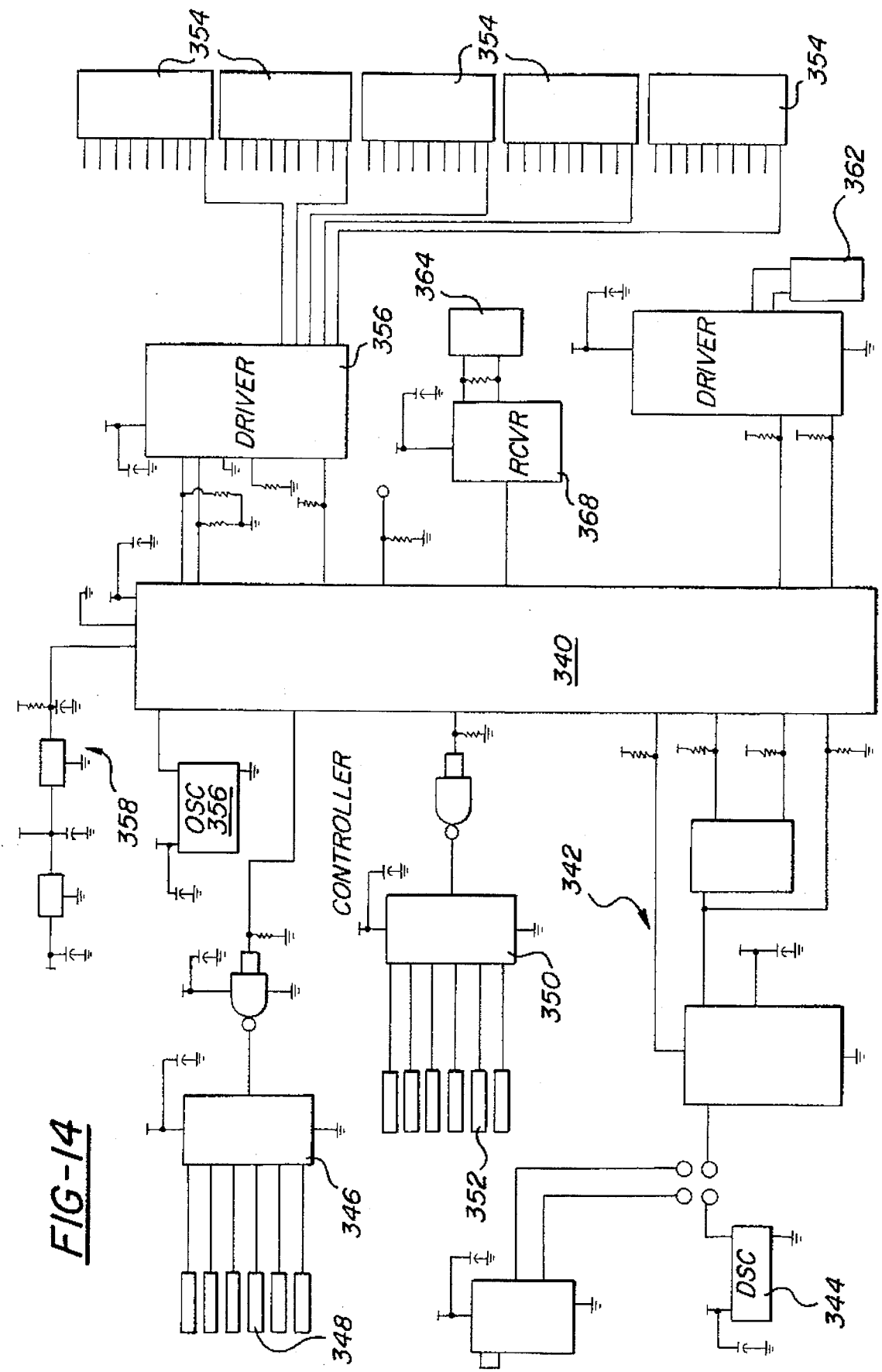

FIG. 14 is a circuit diagram of the synchronizer.

DESCRIPTION OF THE PREFERRED EMBODIMENT

Figure 1:
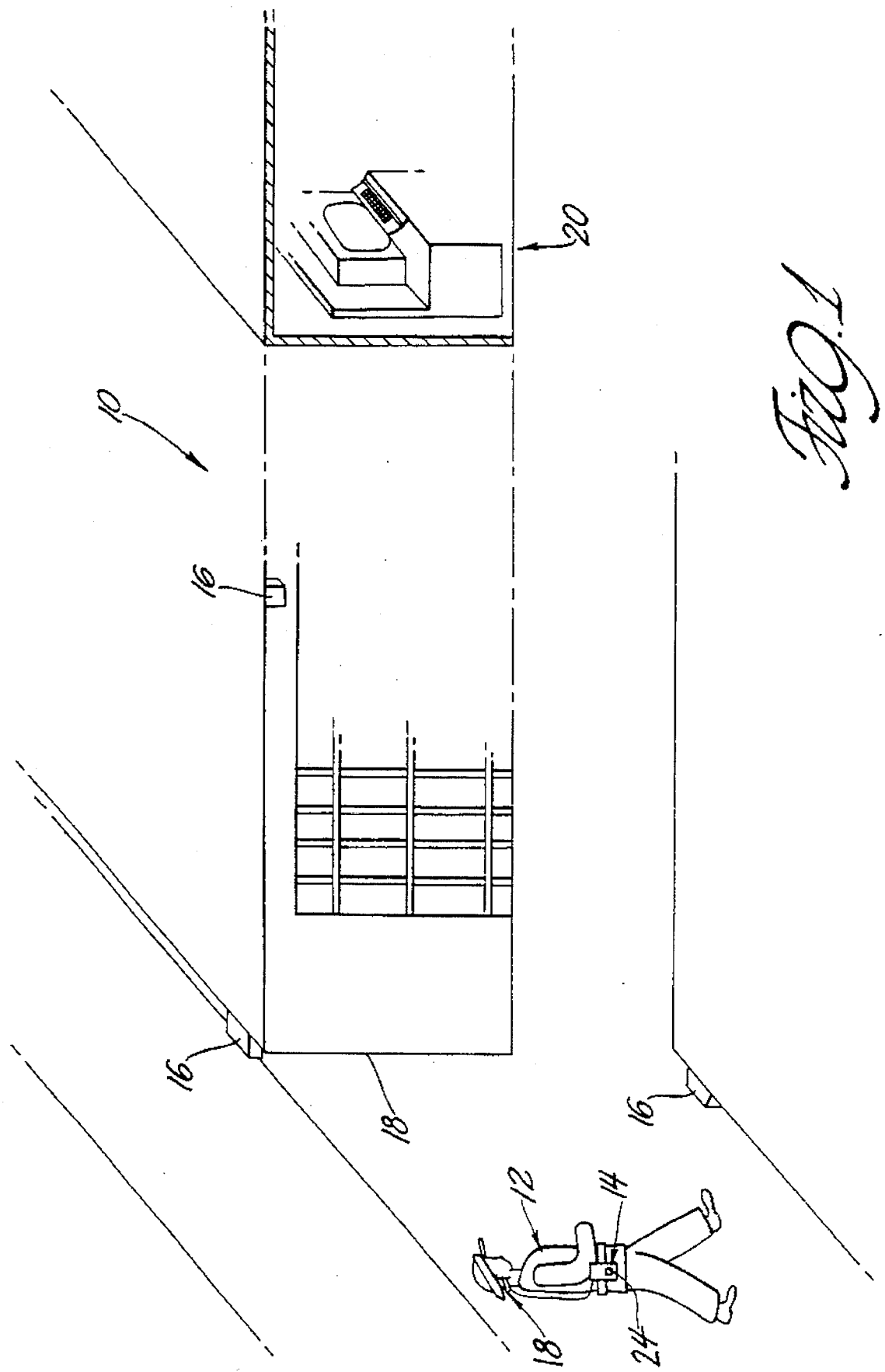
FIG. 1 is a general perspective of the subject invention.

A monitoring assembly for monitoring distress and the location of mobile objects is generally indicated at 10 in FIG. 1. The monitoring assembly 10 monitors the location of mobile objects 12, which may be personnel, guards, and movable or inanimate objects. The assembly 10 additionally monitors the occurrence of distress among one of the mobile objects or personnel 12 and may therefore respond and aid the personnel 12 by determining the location thereof.

The assembly 10 includes a plurality of transponder means 14 for transmitting a data signal. The transponder means 14 is generally a transponder attached to a mobile object or person 12. The transponder 14 is carried by a person or mobile object 12 and indicates the location and condition of distress. The monitoring assembly 10 also includes transceiver means 16 for receiving the data signal and identifying the transmitting transponder 14. The transceivers 16 are located in spaced areas about the monitored structure 18 such that upon transmission by any transponder 14, at least one transceiver 16 will receive the transmitted signal, though it is preferable to have several transceivers 16 in range receiving a transmitted signal.

The transceiver 16 measures signal strength and transmits via hardwiring an information signal to central controller means 20 or central controller. The central controller 20 monitors the location of each transponder 14 and provides indication and status of any distress or emergency condition, as will be subsequently discussed. The central controller 20 can also transmit commands through the transceivers 16 to selected transponders 14.

Figure 7A:
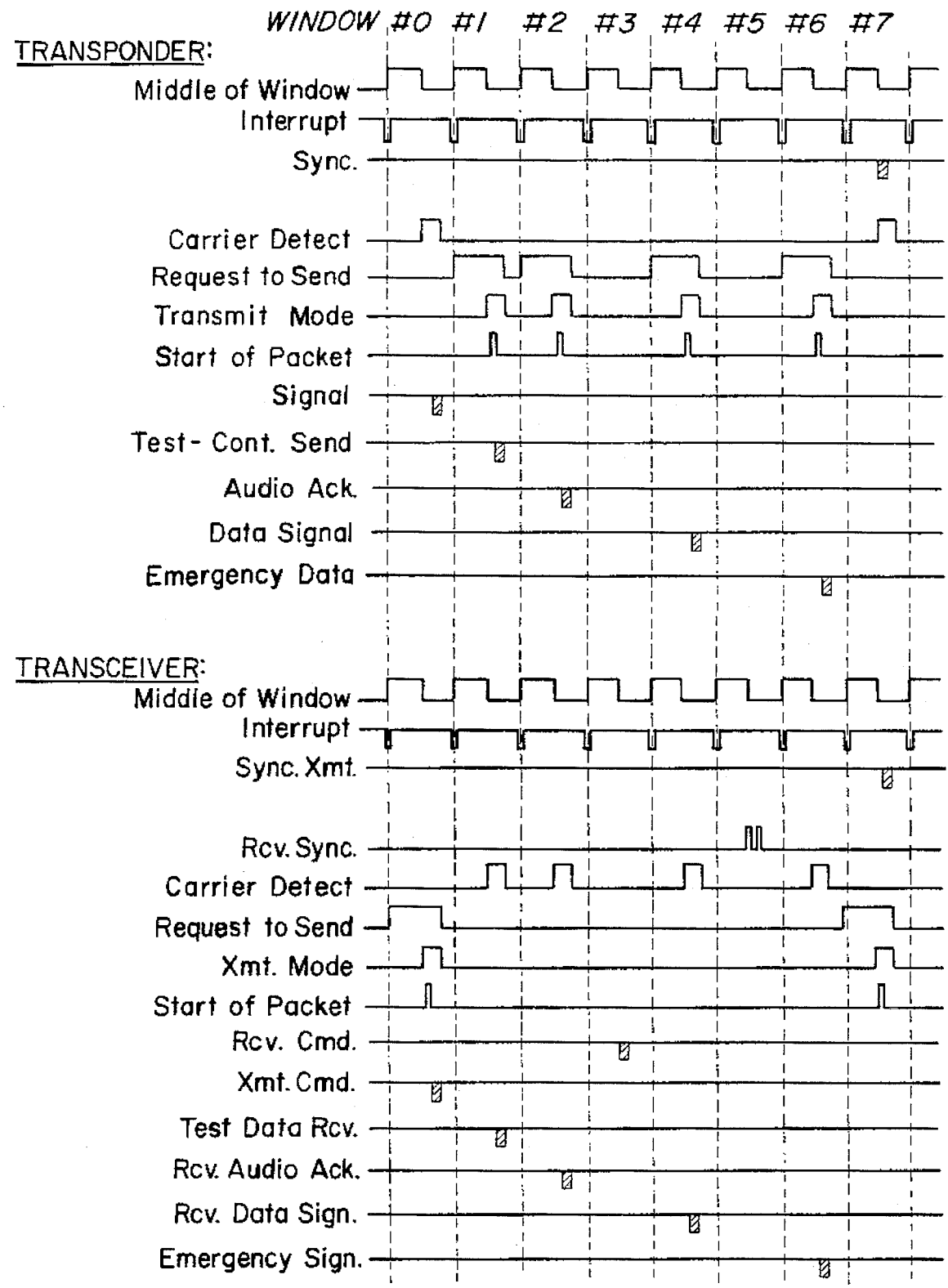
FIG. 7 is a detailed diagram of the transponder and transceiver and synchronizer.
Figure 7B:
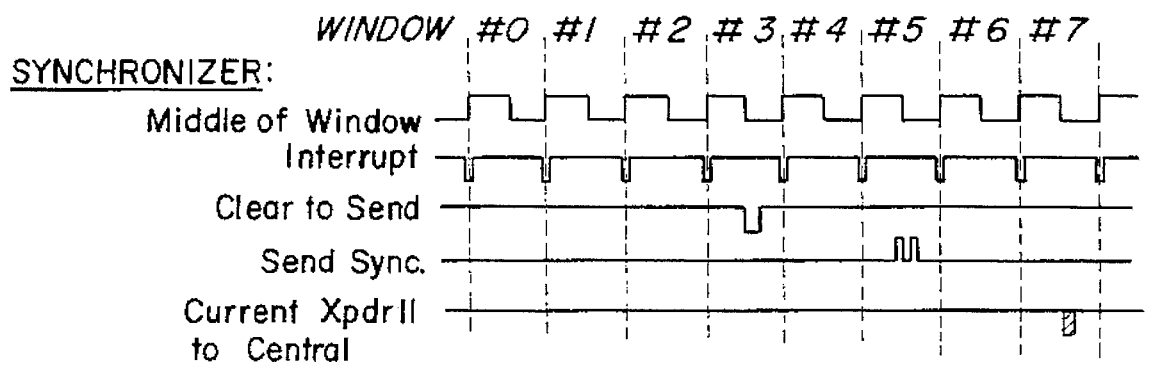

Each transponder 14 is assigned a specified time range different from the other transponder time ranges within which normal data transmissions therefrom may occur, preventing the possibility of overlap and interference from other transponders 14. In other words, if there are only three transponders 14 in the system, transponder #1 would be assigned a first time range 0–1, transponder #2 would be assigned a second time range 1–2, and transponders #3 would be assigned a third time range 2–3. Each time range is divided into a plurality of time windows allowing different functions to occur within each window by the transponders 14 and transceivers 16. During each time range, only the assigned transponder 14 will transmit a status data signal during a designated window thereof. In this manner, the receiving transceivers 16 and central controller 20 can identify the particular transponder 14 and associated data by the time range and window within which transmissions were received. Additionally, the transponder 14 transmits an identification code indicative of its assigned time range to further ensure correct identification. During other specified windows of the time range, transmissions to all the transponders 14 can occur along with transmissions from any transponder 14 under emergency or other conditions as subsequently discussed. An example of a time range with the time windows for the transceivers 16 and transponders 14 thereof is illustrated in FIGS. 6–7 and 10, and will be subsequently discussed.

Figure 3:
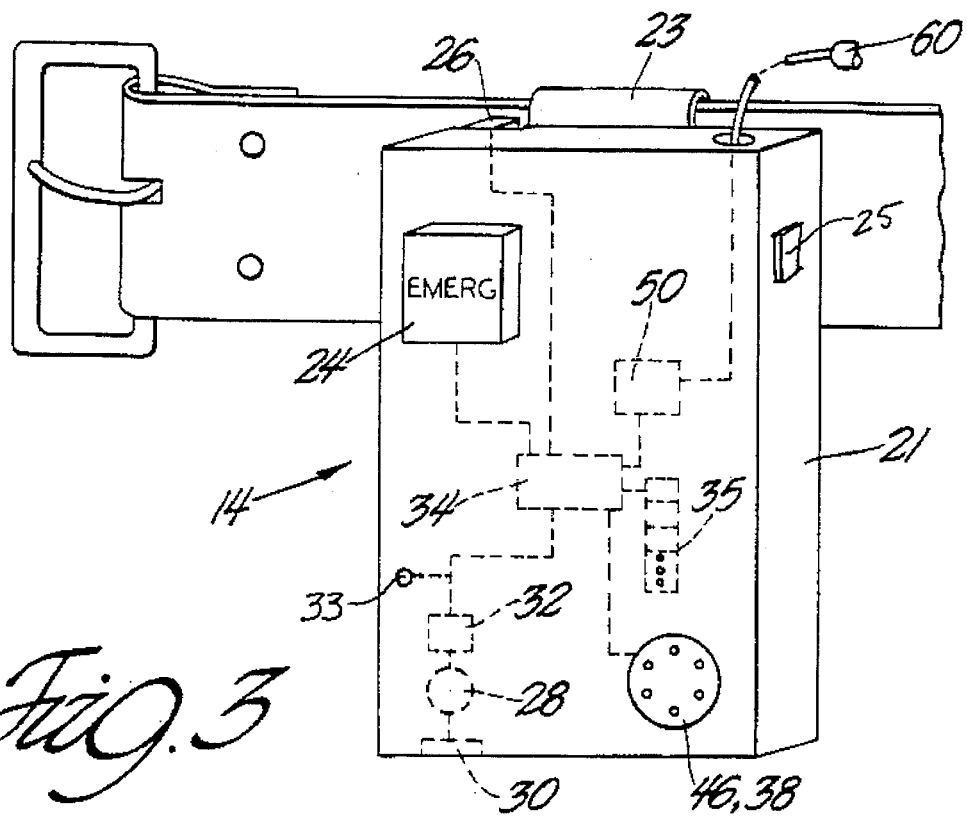
FIG. 3 is a perspective view of the transponder of the subject invention.
Figure 4:
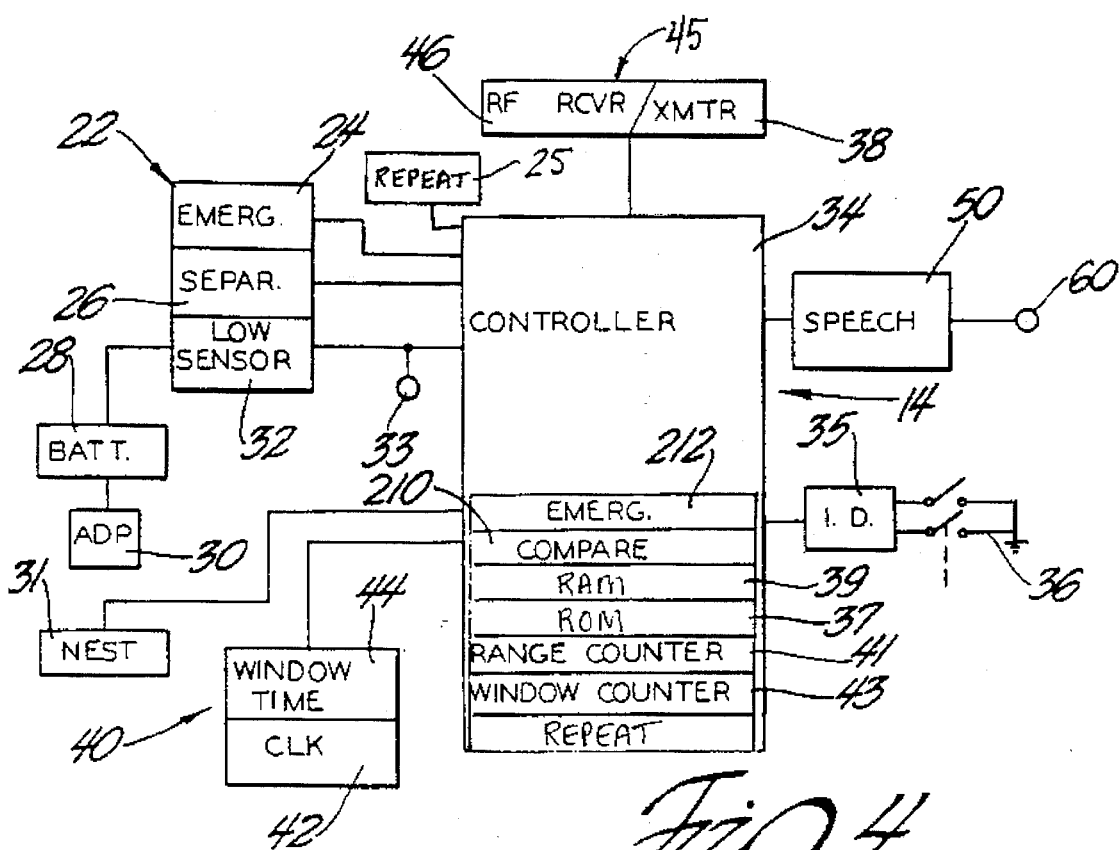
FIG. 4 is a detailed block diagram of the transponders.
Figure 6A:
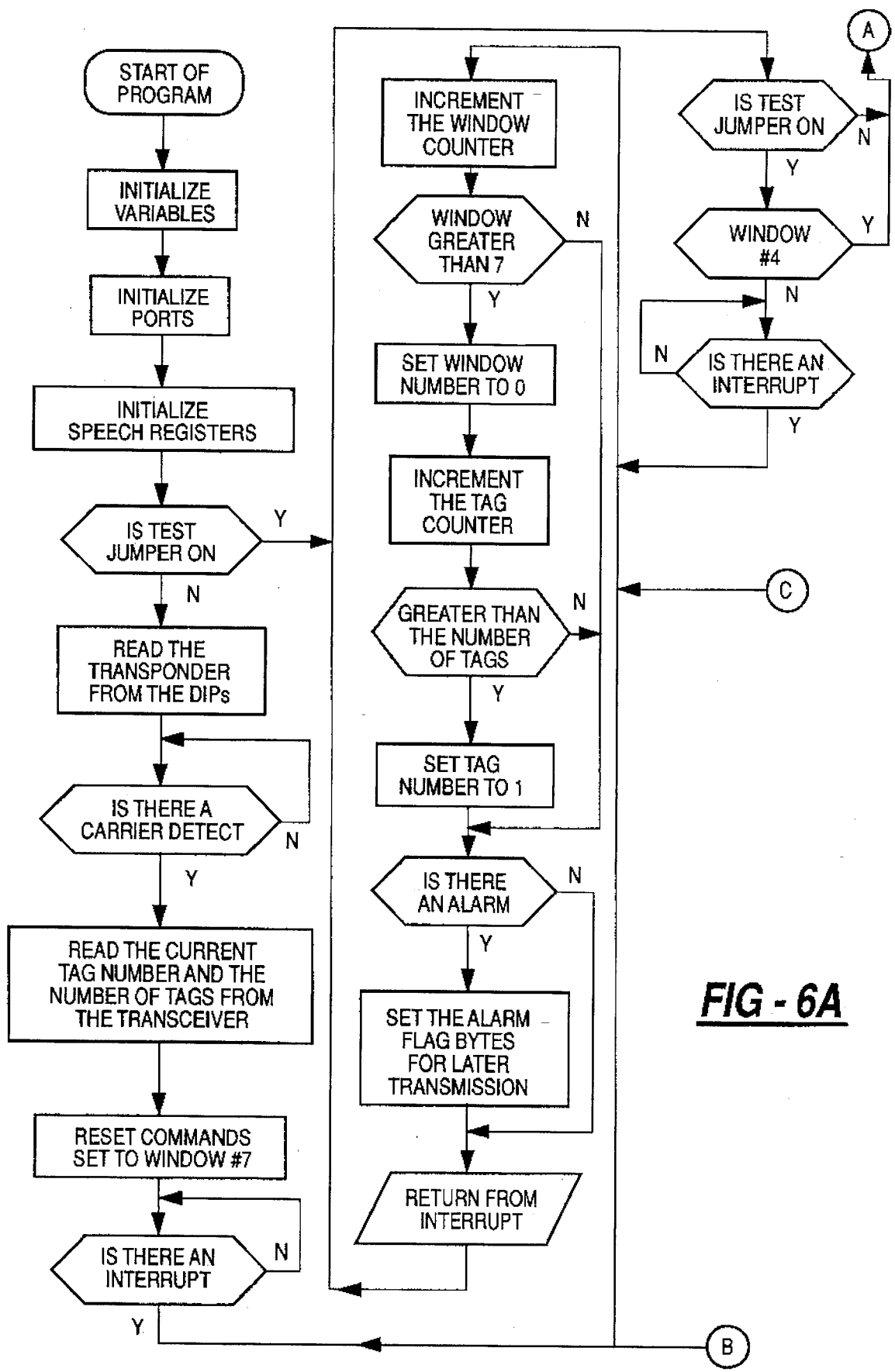
FIG. 6 is a flow chart of the transponder controller.
Figure 6B:
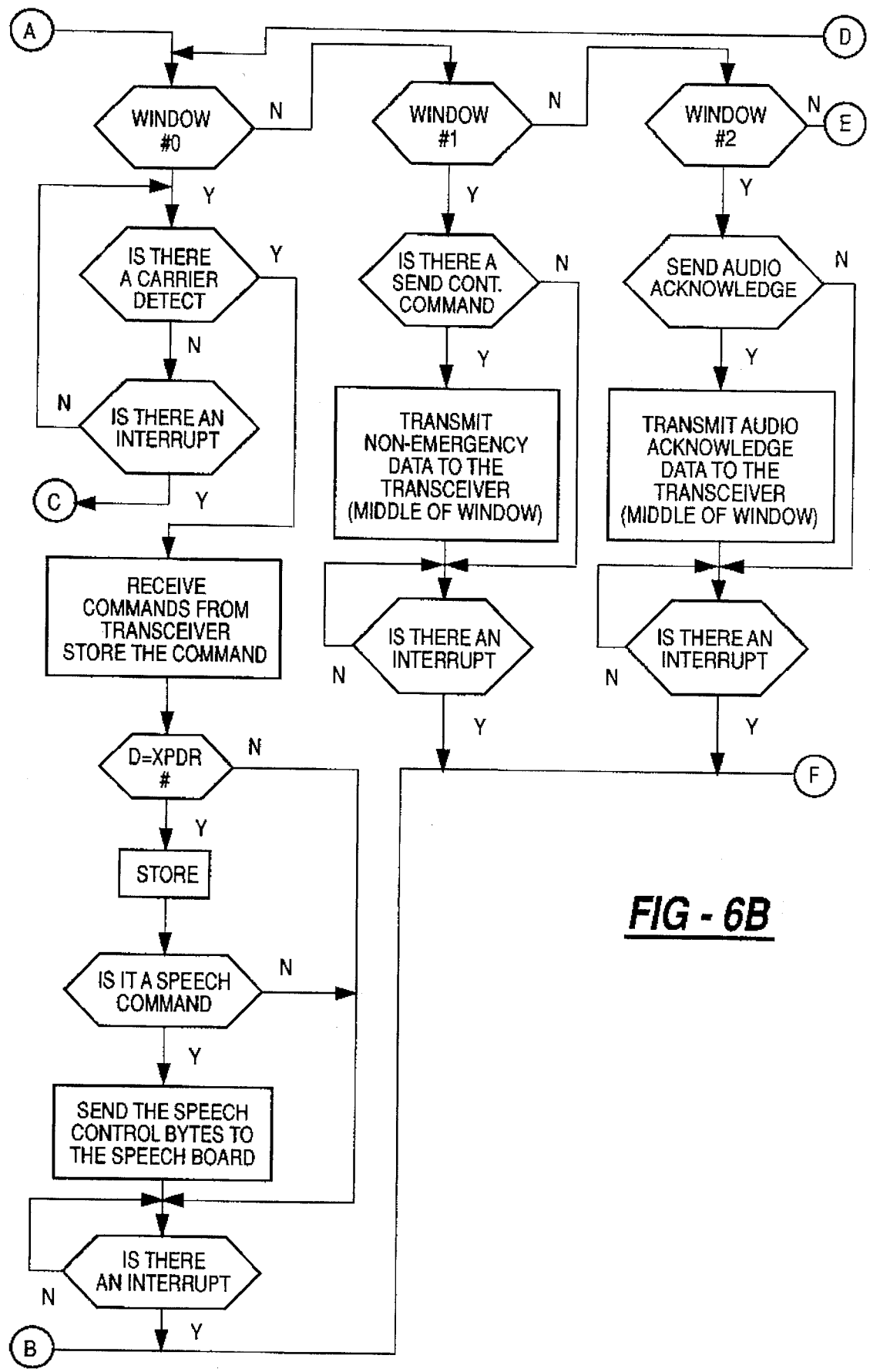
Figure 6C:
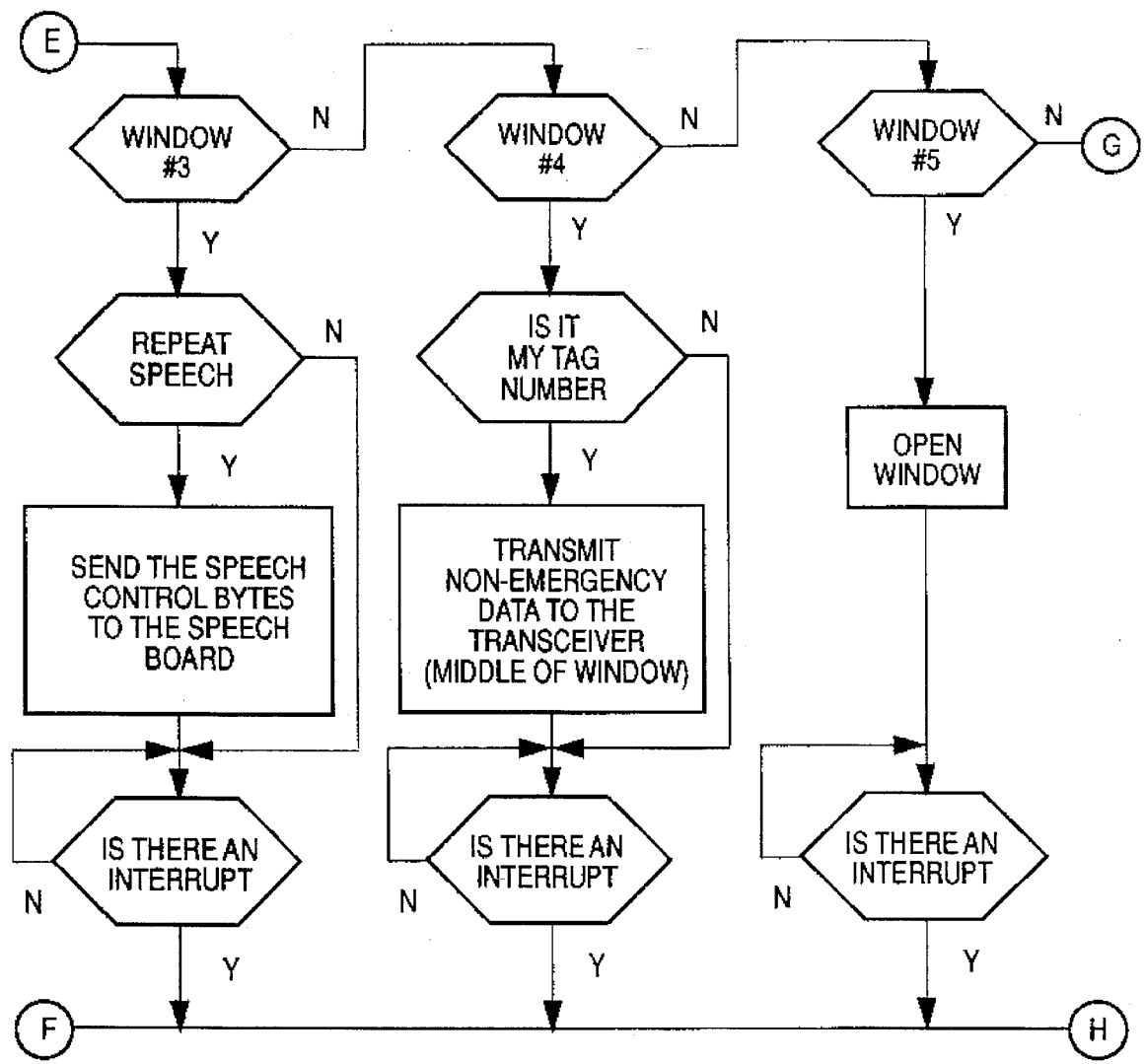
Figure 6D:
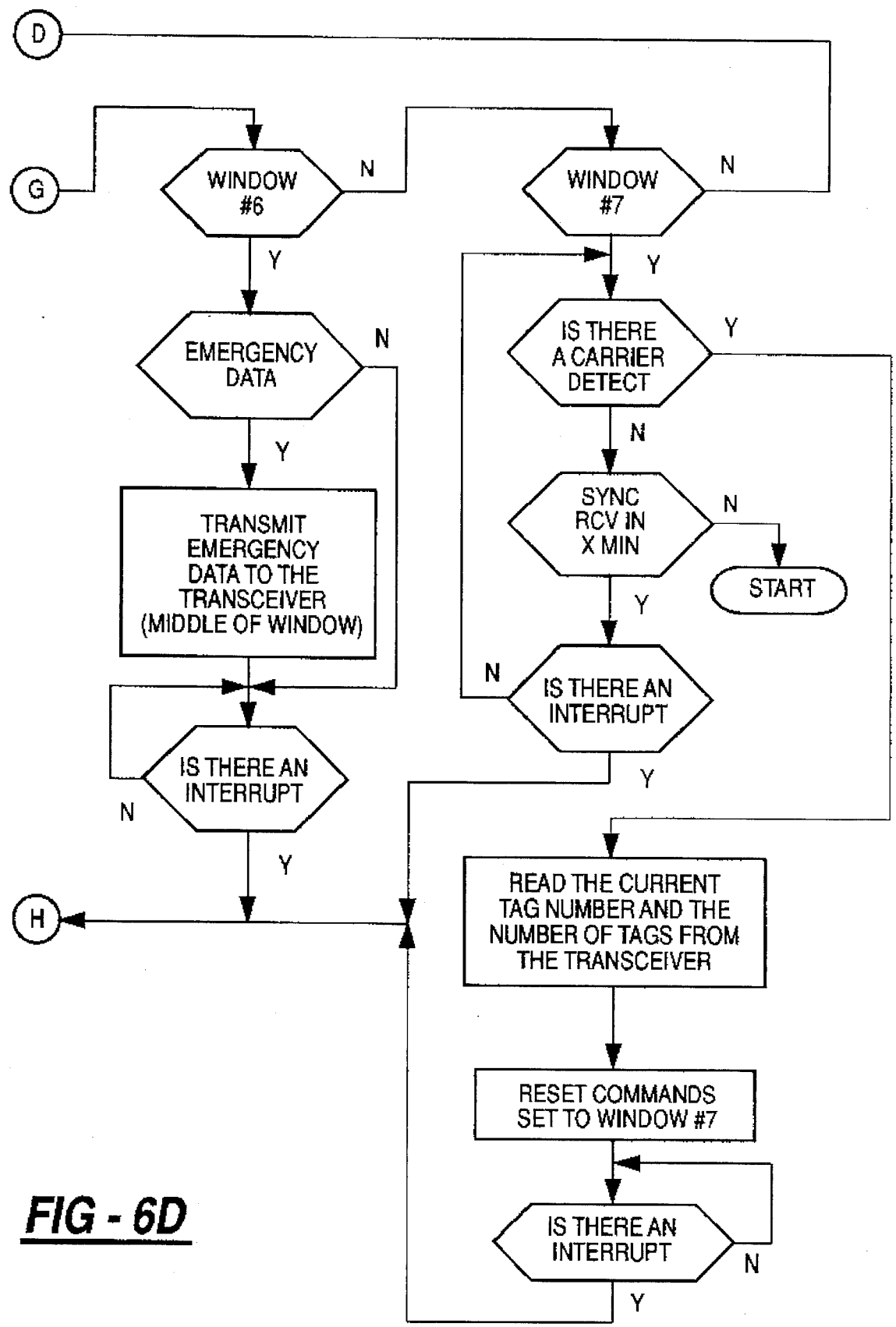

The transponder 14 includes a housing 21 having a clip 23 or other attachment thereon for securing to a mobile object 12, e.g., the belt of a person, as illustrated in FIG. 3. As also illustrated in FIGS. 3 and 4, the transponder 14 includes sensing means 22 for sensing external conditions for communication to the central controller 20. The sensing means 22 includes an emergency button 24 which is manually actuatable by the person 12 for producing an emergency signal. The sensing means 22 also includes a separation switch 26 for sensing separation of the transponder 14 from the object or person. The separation switch 26 also produces the emergency signal indicative of the status thereof. The separation switch 26 may be a suitable contact switch operably connected with the belt to which the transponder 14 is attached. Other types of sensors may be utilized, such as a switch to produce an emergency signal when the person or transponder move from vertical to horizontal. The man-down switch may generally be a tilt switch, as commonly known. It is to be understood that other types of emergency switches may be incorporated or utilized. Also included is a repeat button 25 for manual actuation by the person when it is desired to repeat the last played audible message.

The transponder 14 includes a battery 28 for supplying power thereto. The battery 28 is generally rechargeable and may be recharged upon changing of the shift of each person 12 and turning in their assigned transponder 14. The battery 28 is attached to an adapter 30 which receives an a.c. voltage for charging the battery 28 from a nest 31 of the head controller 20.

The sensing means 22 also includes a low battery sensor 32 for producing a low battery signal upon determination that the charge on the battery 28 has depleted below a predetermined magnitude. A green LED 33 will remain illuminated while the battery 28 is charged above the predetermined magnitude and will flash when below the predetermined magnitude.

The transponder 14 includes a transponder controller 34, which is generally a microcomputer. The controller 34 receives from shift registers 35 an identification code unique to the transponder 14. The shift registers 35 are connected to selectable switches 36 which allow manual selection of the identification code by switching and thereby coding of the switches 36. The shift registers 35 provide low and high byte serial code to the controller 34. The controller 34 includes a ROM 37 for storing program code for the operation thereof according to the flow chart in FIG. 6. The controller 34 includes a RAM memory 39 for storing program variables and a field for the total number of transponders 14 in Or allocated for a system for timing and cycle determination. Also included is a field in RAM memory 39 for storing a sync update time within which the transponder 14 must receive a sync signal or it will restart its program.

The transponder controller 34 receives the emergency signal and battery signal, and produces a coded data signal for r.f. transmission. The coded data signal includes a digital six byte transmission with the following coding: bytes 1 and 2 indicate a general code for system identification used on all r.f. communications; byte 3 is the high byte identification of the transponder and byte 4 is the low byte thereof; byte 5 is data consisting of bits 0–4 as open, bit 5 indicates low battery (code=0 indicates battery charged, code=1 indicates charge low), bit 6 is the emergency indicator (code=0 indicates no emergency, code=1 indicates emergency), and bit 7 is an audio acknowledge (code=0 indicates not received audio command, code=1 indicates received audio command); and byte 6 is the checksum. A radio frequency transmitter 38 of a radio board 45 receives the coded data signal and transmits the data signal via radio frequency transmission to the transceivers 16 within range of reception thereof.

The transponder 14 also includes transponder timing means 40 for establishing the time ranges and sequential time windows wherein each particular transponder 14 is associated with a particular range or number of windows.

The timing means 40 comprises clock means 42 having a quartz oscillator for establishing a clock signal of a predetermined frequency, i.e., 32 KHz. Window timer means 44 receives the clock signal and divides the clock signal into the time windows producing a start window signal (interrupt signal) at the start of each time window, and for producing a middle window signal at the center or middle of each window which are each sent to the controller 34. The window timer means 44 also receives the sync signal from the controller 34 to ensure synchronization with the system 10. Each window occurs for a ⅛ second duration. It is to be understood that the window duration may be easily modified.

The controller 34 maintains count of the windows and therefore time range thereof to determine functions to be performed. In general, during the first window (window 0), the transponder 14 checks the sensor means 22 and receives commands from transceivers 16. During the second window, the transponder 14 checks sensor means 22. In the third window, the sensor means 22 is checked and the audio acknowledge transmitted during the middle of the window. In the fourth window the sensor means 22 is checked. In the fifth window the sensor means 22 is checked and the data signal is transmitted to the transceivers 16 during the middle of the window by comparing means 210 of the controller 34. In the sixth window the sensor means 22 is checked. In the seventh window the sensor means 22 is checked and the emergency data signal is transmitted by emergency 212 of the controller 34. In the eighth window (window 7) the sensor means 22 is checked and the synchronizing signal is received. The controller 34 is placed in stand-by mode to prevent power depletion between windows and after all functions have been performed during a window. The start window signal "interrupts" or wakes up the controller 34 to perform the necessary checks, as subsequently discussed. In general, transmissions and receptions by the transponder 14 occur during the middle of the window, while the checks occur at the beginning of the window. The checking of the sensor means 22 occurs at each window to ensure that an emergency condition will be detected by the controller 34 since it only wakes up every ⅛ second.

Upon reception of the fifth window interrupt, the transponder controller 34 samples each of the sensor means 22 to see if bits are set for each sensor, and transmits the data signal to the r.f. transmitter 36, which in turn transmits over radio frequencies the data signal.

The controller 34 includes a range counter 41 for counting and keeping track of the present time range for comparison with the transponder number code in the switch 36 to determine when to transmit the normal data signal. Initiation of the transponder 14 sets the counter 41 to the present time range. Also included is a window counter 43 for counting zero to seven to maintain count of the window in each time range indicative of functions to be performed. The counters 41, 43 are implemented through software programming in the controller 34.

Upon receiving the emergency signal or the battery signal during any window, the transponder controller 34 by means 212 sets an emergency bit and/or low battery bit in memory 39, and transmits the coded emergency signal during the emergency window of two sequential time ranges, i.e., during two sequential emergency or seventh windows (window #6), or as the data signal during its assigned time range. The transponder controller 34 need not wait until the time range of its own for emergency transmission. Transmission will occur during any emergency window and thereafter reset. Therefore, the bits remain set for 16 windows. The statuses are not reset if the emergency conditions are still detected.

The radio board 45 provides for r.f. communication, both transmitting and receiving. The radio board 45 includes the r.f. transmitter 38 and an r.f. receiver 46. The radio frequency receiver 46 receives transmitted radio frequency signals from the transceiver 16. The radio board 45 comprising the r.f. transmitter 38 and r.f. receiver 46 is connected to and controlled by the controller 34. During a receive window, the r.f. receiver 46 is powered or enabled and receives r.f. signals from the transceivers 16. The received command signal includes an eight byte code including the following: bytes 1 and 2 indicate a general code; byte 3 supplies the command comprising reset, audio(on/off), ready to reset, and send continuous; byte 4 contains the high byte of the transponder number, byte 5 contains the low byte of the transponder number, byte 6 contains a zone number, byte 7 contains an area number, and byte 8 is the checksum. The ready to reset mode places the transponder 14 in a waiting mode to discontinue transmission which allows testing of other transponders 14. The reset field resets the transponder from the waiting mode to normal operation. The audio field provides an audio code to be communicated to the transponder 14 for audio commands to the user. The send continuous field tells the transponder 14 to continue sending in the first window for testing thereof.

The transponder 14 may provide audible messages to the person carrying the transponder 14. The transponder 14 includes audio means 50 for audibly communicating with the person. The audio means 50 is connected to the controller 34 and communicates messages to the person. The audio means 50 generally includes an ear phone 60 for playing audible messages to a user thereof, as subsequently discussed.

Upon receiving the eight byte command code, the controller 34 compares the received identification number to the transponder code stored in the code switches 36. If the codes match, the transponder 14 acts on the information. The audio code of the received command signal indicates whether or not audio is to be turned on and a message communicated to the transponder user. If the audio code is set, the audio means 50 is enabled and an acknowledge bit set. During the following acknowledge transmit window or third window (window #2), the controller 34 sets the audio acknowledge bit=1 in the transmitted r.f. data signal to acknowledge the audio control signal reception to the head controller 20.

Audible communication by the transponder 14 is accomplished by storing predetermined massages in ROM memory 37. The message instructs the personnel that an emergency has occurred and to go a specified zone and area, which is indicated in the command signal. The controller 34 forms the message by accessing the memory 37 based on the zone and area codes, to obtain the message identifying emergency in the zone and area. For example, the zone may be the east wing of the building and the area may be the cafeteria. The audio means 50 audibly communicates the message to the user.

The general operation of the transponders 14 is illustrated in the flow chart of FIG. 6.

At START of the program or any powering up of the transponder 14, the controller 34 initializes variables, ports, and speech registers, i.e., clearing same. Thereafter, it is determined if the test jumper 310 is on, e.g., if a jumper is connected indicating test mode. If not in test mode, the transponder identification code is read from the registers 35. A carrier detect signal is waited for from the radio board 45.

The radio board 45 is powered to receive an r.f. signal. Upon reception of an r.f. signal, the carrier detect signal is produced. Once a carrier detect signal is produced, the current transponder number (current time range) and the number of transponders in the system is received from the transceivers 16 via the sync signal. Upon initial start-up or after power down, the transponder 14 must await a sync signal to be integrated into the system on the proper timing sequence. Furthermore, upon initialization of power-up, and after receiving the synchronized signal, the transponder 14 may transmit a resynch signal with transponder number during window #1 to indicate to the contra controller 20 that it is in the system and operating.

The command field and data field are reset to zero and the window counter is set to window #7. Thereafter, the transponder 14 waits for an interrupt (beginning of window signal). When the interrupt occurs, the program continues to the interrupt subroutine.

The interrupt subroutine functions as follows. The window counter is incremented. If the window counter is greater than 7, the window counter is set to 0, the current transponder number is incremented, and if the current transponder number is greater than the total number of transponders in the system, the transponder number is set to 1. If the current transponder number is not greater than, no further change is made to the current transponder number. If the window counter is not greater than 7, the program branches to check the sensors 22. The emergency sensors 22 are checked to see if triggered. If emergency conditions exist, the emergency bits are set for later transmission. Thereafter, a return from the interrupt occurs.

After interrupt, the program continues to implement the functions of the current window. If the test jumper 310 is not connected, the appropriate window functions are executed. If the test jumper is on, it is determined if window #4 is current, and if there is an interrupt, the program returns to the interrupt subroutine. Otherwise, the program continues and implements each of the windows 1–8.

If window 0 is current, the receiver is turned on and a carrier detect signal is waited unless an interrupt first occurs. If an interrupt occurs before the carrier detect, the program continues to the interrupt subroutine indicating no transmissions occurred. When the carrier detect first occurs, the command signal from the transceivers 16 are received. The identification code in the command signal is compared to the transponder number, and if a match the program continues, the otherwise an interrupt is awaited. Upon validation of the identification number, the command signal is stored in the command register. Thereafter, it is determined if the speech bit is set, and if so, the speech control bytes are stored and sent to the audio means 50. The controller 34 checks the commands in byte 3 including debugging conditions, reset, ready to reset, send continuous, and also the audio condition. If the audio is turned on, a zone number and an area number in bytes 6 and 7 is provided to the transponder 14 and a message audibly communicated to the person. The audio acknowledge bit is set in memory. The receiver is turned off and again, the interrupt is checked. After the completion of each window, the program continues to the interrupt subroutine, as previously described, upon the occurrence of the interrupt signal.

During window #1, it is determined whether or not there is a send continuous command (test) in the command field. If so, the nonemergency data is transmitted to the transceiver 16 in the middle of the window. Otherwise, no action occurs. Thereafter, again an interrupt is checked and the program is continues to interrupt subroutine upon occurrence thereof.

During window #2, the controller 34 checks to see if the audio acknowledge bit is set. If so, the transmitter is powered and the data signal with the audio acknowledge information is transmitted to the transceiver 16 in the middle of the window. Again, an interrupt is thereafter checked and the interrupt subroutine entered.

During window #3, the repeat button 23 is checked to see if actuated. If not, the interrupt is awaited. If so, and if the speech control bytes have been set, the bytes are again sent to the speech board for repetition of the audible communication. Thereafter, an interrupt occurs and the interrupt subroutine is entered.

During window #4, it is first determined if the time range is the same as the transponder identification. If so, the transmitter is enabled, and the data signal is transmitted to the transceiver 16. This data transmitted is only for and by the transponder 14 identified with the associated with time range, i.e., comparison of the counter 41 and the switch code through means 216 of the controller 78. If an emergency bit is set for this transponder 14, this information is also sent, along with low battery. Thereafter, an interrupt is checked and the interrupt subroutine is entered.

During window #5, nothing occurs and only an interrupt is checked to enter the interrupt subroutine.

During window #6, it is first checked if emergency bits have been set. If emergency bits exist, the transmitter 38 is powered and emergency data is transmitted to the transceivers 16. The bits are reset and power discontinued. An interrupt is waited to enter the interrupt subroutine.

During window #7, it is first determined if a carrier detect signal has occurred. If an interrupt occurs prior to the carrier detect, the interrupt subroutine is entered. If a carrier detect first occurs, the receiver is powered to look for a sync signal. The sync signal includes the current transponder number and the number of transponders in the system. The synchronization of the window timer means 44 is checked and adjusted if necessary to the indicated transponder number and current window. The variables are reset. The commands are reset and window #7 is set. If no sync or reset signal is received with a predetermined time, i.e., 5 minutes, the program branches to START. Otherwise, an interrupt is checked and the interrupt subroutine is entered.

FIG. 7 illustrates the timing diagram of functions and signals produced during each window for the transponders 14. The middle of window signal comprises a pulse which is high during the first half of the window and goes low for the second half of the window. The interrupt signal or start of window signal is an instantaneous pulse indicating the start of each window. Both of these signals are produced by the timing means 40. The sync signal from the transceiver is received during the middle of window #7. The carrier detect signal occurs during the middle of the window for duration of half of the second half of the window indicating receiving of r.f. transmission can occur, and occurs during windows #0 and #7. The pulse for the request to send signal occurs during windows #1, 2, 4, 6 to set up the transmitter for transmissions, i.e., powering. The transmit mode signal occurs during the second half of windows #1, 2, 4, 6 to prompt the radio board 45. The start of packet signal occurs at approximately the middle of windows #1, 2, 4, 6 to indicate the subsequent transmission of data from the controller 34 to the transmitter. The command signals from transceiver are received during window 0. The continuous send of data to transceiver occurs during window #1 in the second half of the window. The audio acknowledge signal transmitted to the transceiver 16 occurs during the second half of window #2 after the start of packet signal. The data signal is transmitted to the transceiver 16 during the second half of window #4 upon occurrence of the start of packet signal. The emergency data is transmitted during window #6 upon start of packet signal. The carrier detect signal, request to send signal, transmit mode signal, start of packet signal are sent to the radio board 45 to control operation of same and appropriate powering thereof.

The transponder 14 utilizes the specific circuitry illustrated in FIG. 5. The clock means 42 includes crystal oscillator means comprising a circuit operating at 32.76 KHz. The oscillator CX is connected to the window timer means 44. The window timer means 44 includes a divider circuit 55 (type 4848) having a reset input, clock input and output. The timer output indicating the middle of a window goes to the clock input of a flip flop 56 having a Q' output and a reset input of the controller 34. The flip flop 56 produces the start of window signal (or interrupt signal) to the controller 34, and is reset by the controller 34 once the functions have been completed. The timer output of the divider circuit 55 also produces the middle of the window signal directly to the controller 34. The reset input of the divider circuit 55 occurs as a result of reception of the sync signal to maintain synchronization.

The controller 34 includes a microcomputer of the type MC68HC705C8. The microcomputer 34 includes reset outputs which are connected to the resets of the divider circuit 55 and flip flop 56. The microcomputer 34 receives the middle of the window signal along with a start window or interrupt signal. The pair of shift registers 35 each include eight outputs connected to the manual selectable switches 36 for identifications. The output of the second series of shift register 35 produces the identification number to the transponder controller 34 in serial form. Clock and shift signals are provided to the shift register from the microcomputer 34. A serial signal is produced at the Q output of the registers 35 to the controller 34.

A watchdog timer 57 is provided at the reset of the microcomputer 34 for resetting same at predetermined time intervals to ensure proper operation. Furthermore, the microcomputer 34 includes a sensor input for the separation switch 26 and the emergency button 24. A repeat switch 23 may be operated by the operator to allow repeat of any audible communications. A battery input BATT receives the low battery signal.

The radio board 45 is connected to the microcomputer 34 to communicate received signals, and transmit data signals, and control the power thereto. The following signals are communicated between the radio board 45 and the controller 34: test data out; start of packet; request to send; receive/transmit signal (0=receive, 1=transmit); data signal out; carrier detect; and command signal. The radio board 45 is a 900 MHz FSK link using an AGC and received signal strength indicator. The microcomputer 34 controls the radio board 45 and therefore receiver 46 and transmitter 38 by the above signals.

The controller 34 includes a mode signal input 310 (0=run, 1=test) for either allowing normal operation of the transponder 14 in run mode, or allowing the transponder 14 to be tested in test mode. The test mode is for general debugging by oscillator control.

The microcomputer 34 includes an audio output which transmits an audio signal to the audio means 50. The transponder 14 includes a speech and synthesizer board 59 connected by a serial to parallel converter 58 to the controller 34. The audio signal containing the audio message is formed in the controller 34 and sent through the converter 58 to the synthesizer board 59. The synthesizer board 59 is connected to an earphone 60 for the user can obtain the message. The serial to parallel converter 58 is of the type commonly known in the art. The speech synthesizer board 59 utilizes commercial synthesizer chip sets such as type TC8833F by Toshiba with external EPROM.

Figure 8:
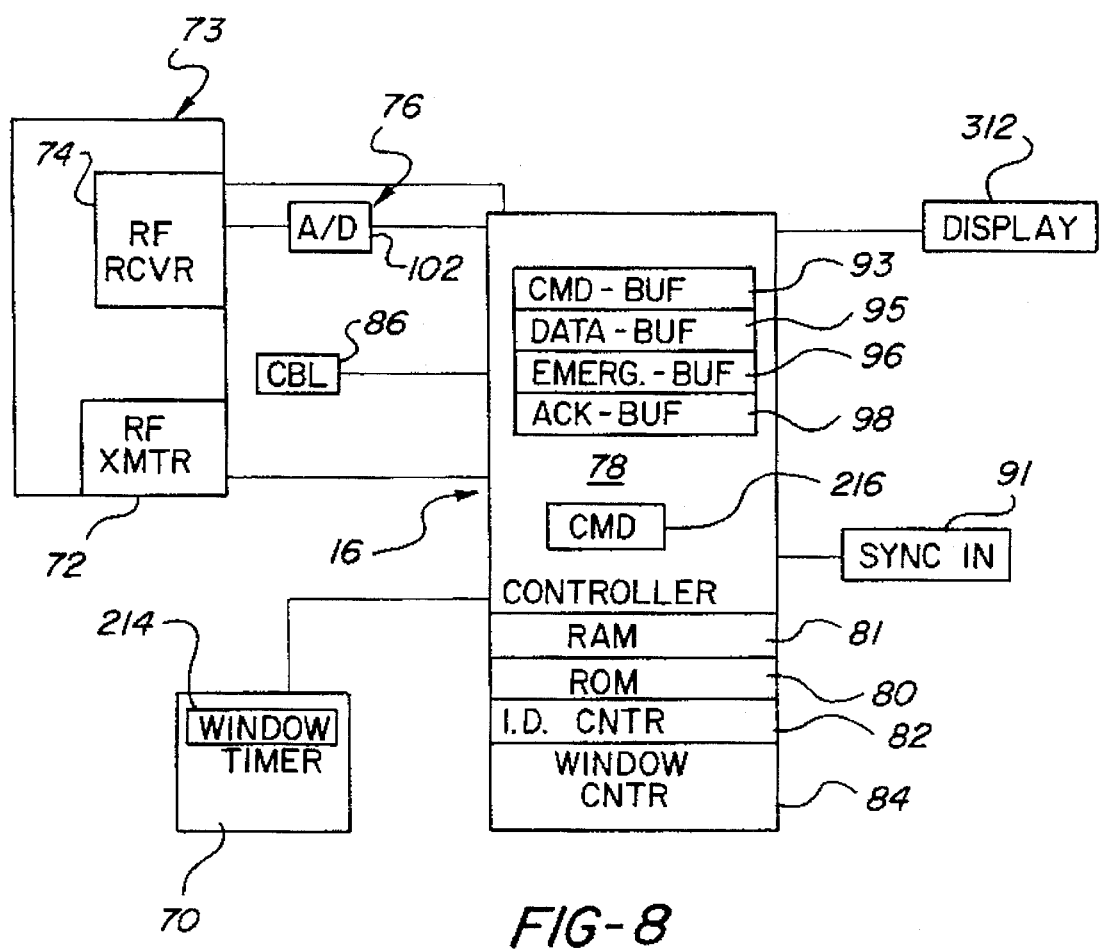
FIG. 8 is a detailed block diagram of the transceiver.

The transceiver 16 is generally illustrated in FIG. 8 and receives a data signal from the transponders 14 and identifies which of the plurality of transponders 14 are transmitting and the signal strength thereof, and communicates the information to the central controller 20. Each of the transceivers 16 includes timing means 70 for establishing sequential time windows associated with each of the transponders 14. The timing means 70 is configured as the transponder timing means 40. Such time windows and timing means 70 are synchronized with the transponders 14.

The transceivers 16 are generally connected to the structure 18 by suitable means, such as fasteners, and is hard wired to the central controller 20. The r.f. range of the transceivers 16 determines placement thereof in the structure such that over lap in the r.f. range between transponder 14 and transceiver 16 occur.

The transceivers 16 include a radio board 73 for r.f. communication with the transponders 14, and are constructed as the radio board 45 of the transponder means 14. The radio board 73 includes command transmitter means 72 for transmitting the command signal or audio signal over radio frequencies to the transponders 14. The form of the command signal was discussed previously with respect to the transponders 14. Location receiver means 74 receives the data signal transmitted by the transponders 14 over radio frequencies. The data signal is measured for signal strength by measuring means 76. A transceiver controller 78 receives commands from the central controller 20 for continued communication to the transponders 14 through the transmitter means 72. The controller 78 also receives beginning of the window (interrupt) and middle of the window signals from the timing means 70. The controller 78 operates under program code stored in ROM memory 80 according to the flow chart illustrated in FIG. 10. A RAM memory 81 stores variables used in the programming, i.e., total number of transponders indicative of the number of time ranges in a cycle. The transceiver controller 78 also receives the measurement signal from the measurement means 76 indicative of signal strength.

A command buffer 93 stores the command signal from the central controller 20 during the previous cycle. A data buffer 95 stores the data information from the transponder 14 for status data signal, while an emergency buffer 96 stores the emergency data information, and an acknowledge buffer 98 stores acknowledge information transmitted by the transponders 14.

The controller 78 includes identification counter means 82 for counting the time ranges in a cycle for comparison to the identification numbers of the 2 bytes in the data signal associated with each transponder 14. The controller means 78 also includes window counter means 84 for cyclicly counting zero to seven upon each beginning of window signal, whereupon each complete cycle increments the identification counter means 82. The controller 78 compares the identification counter means 82 to the received identification number to ensure that the proper transponder 14 is transmitting in the proper sequence, and to validate the information associated with the transponder 14 prior to communication same to the central controller 20. The controller 78 produces an information signal which sets forth the transponder identification number, battery status, emergency status, audio acknowledge, and signal strength. The information signal is transmitted over an RS422 transmission cable 86 to the central controller 20. Each transceiver 16 is separately hard wired and connected to the central controller 20 in parallel, as subsequently.

The controller 78 receives from the central controller 20 audio command signal which is received during the transmit or window #3 for inclusion in the command signal for a transponder 14. The transceiver 16 can receive an audio command signal from the central controller 20 for any transponder 14 during any specified time range during communication in the window #3.

The transceiver 16 is synchronized to the central controller 20 via a separate synchronization line 91 directly wired to the central controller 20 which provides the initialization/sync signal. A sync command signal is also received from the central controller 20 to notify the transceiver 16 of the subsequent transmission of the sync signal.

More specifically, the transceivers 16 transmit data to the central controller 20, based on the received information, up to eleven bytes per transmission, coded as follows: bytes 1 and 2 are general coding for system identification; byte 3 includes bits 0 and 1 indicating high bits of transponder number for counting at controller, bit 2 is set at 1 if emergency bytes are to follow, bit 3 is set at 1 if audio acknowledge bytes are to follow, bit 4 is always set to 0, bit 5 indicates low battery when set, bit 6 indicates emergency condition when set, bit 7 indicates audio acknowledge when set; byte 4 indicates the low byte of the transponder number; byte 5 indicates the non-emergency signal strength code; byte 6 includes bits 0 and 1 indicating the high bits of emergency transponder number, bits 2–4 are always 0, bit 5 is set when low battery, bit 6 is set when emergency exists, and bit 7 is set when audio acknowledge; byte 7 indicates the low byte of the emergency transponder number; byte 8 indicates the emergency signal strength code; byte 9 includes bits 0 and 1 as the high bits of the audio acknowledge transponder number, bits 2–4 are 0, bit 5 is set when low battery, bit 6 is set when emergency, and bit 7 is set for audio acknowledge; byte 10 indicates the low byte of the audio acknowledge transponder number; and byte 11 indicates the audio acknowledge signal strength byte.

When sending information to the central controller 20 in response to a reception, transceivers 16 transmit bytes 1–5 based on received data. Additional bytes 6–8 are utilized only if an emergency exits and bit 2 of byte 3 is set. Additional bytes 9–11 are utilized only if an audio acknowledge has been received and bit 3 of byte 3 is set. This additional information is only utilized and transmitted when necessary, and therefore transmission time is minimized. Any combination of the emergency and acknowledge information may be provided with the general data.

The data from the central controller 20 to the transceivers 16 includes a seven byte data stream. Bytes 1 and 2 are general coding. Byte 3 includes the command information comprising reset, audio, ready to reset, send continuous, and the transponder number. Byte 4 includes the high byte of the transponder number, byte 5 includes the low byte of the transponder number, byte 6 is the zone number for audio, and byte 7 is the area number for audio. This information is utilized to transmit commands to the transponders 14, and each field has been previously discussed.

The transceiver 16 also performs various functions during the separate time windows. During window #0, the transceiver controller 78 transmits r.f. commands to the transponders 14 based on previously received information received during the previous time range cycle. During window #1, nothing occurs. During window #2, the transceiver 16 looks for audio acknowledge signals form a transponder 14. During window #3, the controller 78 receives information or commands from the central controller 20. During window #4, the r.f. receiver 74 is powered to receive the data signal from the transponder 14. During window #5, the controller 78 looks to receive the sync signal from the central controller 20 and resets its timing and the transponder timing. During window #6, the r.f. receiver 74 is powered to receive any emergency transmissions from any transponder 14. During window #7, the controller 78 transits status information to the central controller 20, and transmits the sync signal to the transponders 14.

The transceiver controller 78 and therefore transceiver 14 operates under the flowchart illustrated in FIG. 10. The timing means 70 produces the beginning of window (interrupt) and middle of window signals. The transceivers 16 are initialized to set all on the same synchronization from the central controller 20 and to set the counters 82, 84 in synchronization therewith.

The program START occurs upon powering to initialize the variables, ports and display drivers, i.e., clear same. It is first determined if the test jumper is on, and if not the program continues. The transceiver 16 waits to receive serial data from the head controller 20. The serial data is received comprising the number of transponders 14 in the system. Thereafter, the transceivers 16 await the sync signal from the head controller 20. When received, the current transponder number is set to 1, and the window is set to #5 (window within which sync is received). An interrupt is checked.

Upon receiving the interrupt, the interrupt subroutine is entered. The window counter is incremented. If the window is greater than #7, the window is set to #0. The current transponder number is incremented. If the current transponder number is greater than the number of transponders in the system, the transponder number is set to 1. Thereafter, an interrupt is checked. If the window is not greater than #7, the program branches directly to the interrupt check. If the current transponder number is not greater than the number in the system, the program branches to interrupt check.

If a test jumper is on, the program checks if window #4 is current, and if not current, the program awaits an interrupt. Otherwise, the program continues to function in each window.

The program branches to the current window and performs the identified functions.

In window #0, the transceiver determines if a command is waiting in the command buffer 92 for transmission to the transponders 14. If so, the command data is communicated to the transmitter 72 which is at that time powered, and data is transmitted in the middle of the window. Thereafter, an interrupt is awaited.

In window #1, a carrier detect signal is awaited unless an interrupt is first received. Once the carrier detect signal is received, the transceiver 16 receives test data from the transponders 14. This test data is sent to the head controller. This data is only sent during the send continuous mode for debugging, not normal operation. Again, an interrupt is waited.

With regard to window #2, the carrier detect signal or the interrupt is checked. If the carrier detect signal is first received, the audio acknowledge signal from the transponders 14 is received. The acknowledge signal is stored in the acknowledge buffer 98 and sent on to the central controller 20 and an interrupt is awaited.

With regard to window #3, the signal from the central controller 20 is awaited and stored in the command buffer 93, unless an interrupt first occurs. If the signal from the central controller 20 is received, the transponder commands are determined from the information from the central controller 20. Thereafter, an interrupt is checked.

With regard to window #4, a carrier detect signal or interrupt is awaited. When a carrier detect signal is first received, the nonemergency data signal is received from the transponders 14 and stored in the data buffer 96. The controller 78 compares the transponder identification code to the identification counter 82 to validate the transmission, otherwise ignores the information if not validated. Thereafter, an interrupt is awaited.

With regard to window #5, it is determined if transponder #1 is detected. An interrupt is alternatively awaited. If transponder #1 is determined, the sync signal from the central controller 20 is received and the timing means 70 resynchronized. An interrupt is checked.

With regard to window #6, it is determined if either a carrier detect signal is received or an interrupt is first received. When the carrier detect signal is received, the emergency data from any transponders 14 is received and stored in the emergency buffer 96. Thereafter, an interrupt is awaited.

During window #7, the transponder data is relayed to central controller 20 is at the beginning of the window. The controller 78 formats the status/data signal for communication to the central controller 20 from the buffers 95, 96, 98. When the middle of window signal is received, the transceiver controller 78 transmits the information over the cable 86 to the central controller 20. Next there is determined if a sync command and sync signal exist, and if not, the program continues to interrupt. Otherwise, the sync command is transmitted to the transponder 14 during middle of the window for resynchronization of all transponders 14 within r.f. range of the transmitting transceiver 16. All transponders 14 which receive the sync signal may be reset. An interrupt is awaited.

The timing diagram for the transceivers is illustrated in FIG. 7. As is illustrated, the middle of window signal and start of window signal occurs during each window. The sync signal which is transmitted to the transponder 4 occurs during the middle of the window #7. The sync signal is received from the synchronizer means of the central controller 20 during window #5. The carrier detect signals occur during the middle of windows #1, 2, 4 and 6. The request to send or transmit signals occurs during windows #0 and #7. The transmit mode signal occurs during windows #0 and 7. The start of packet signal occurs during windows #0 and 7. The data transmitted from the central controller 20 to the transceiver 16 occurs during the middle of window #3. The command signal transmitted from the transceiver 16 to the transponders 14 occur during the middle of window #0. The audio acknowledge signal is received from the transponders 14 during window #2. The position data signal from the transponders 14 is received during window #4. The emergency data signal from the transponders 14 is received during window #6.

Additionally, the sync signal is sent to all the transponders 14 within the r.f. range of the transmitting transceiver(s) 16 when requested by the central controller 20. The sync signal is transmitted only periodically or selectively, and is not transmitted during each window #7, i.e., once every several minutes. Select ones if the transceivers 16 produce the sync signal during a specified range so that overlap and cancellation of the transmitted signals do not occur between adjacent transceivers 16.

Figure 9:
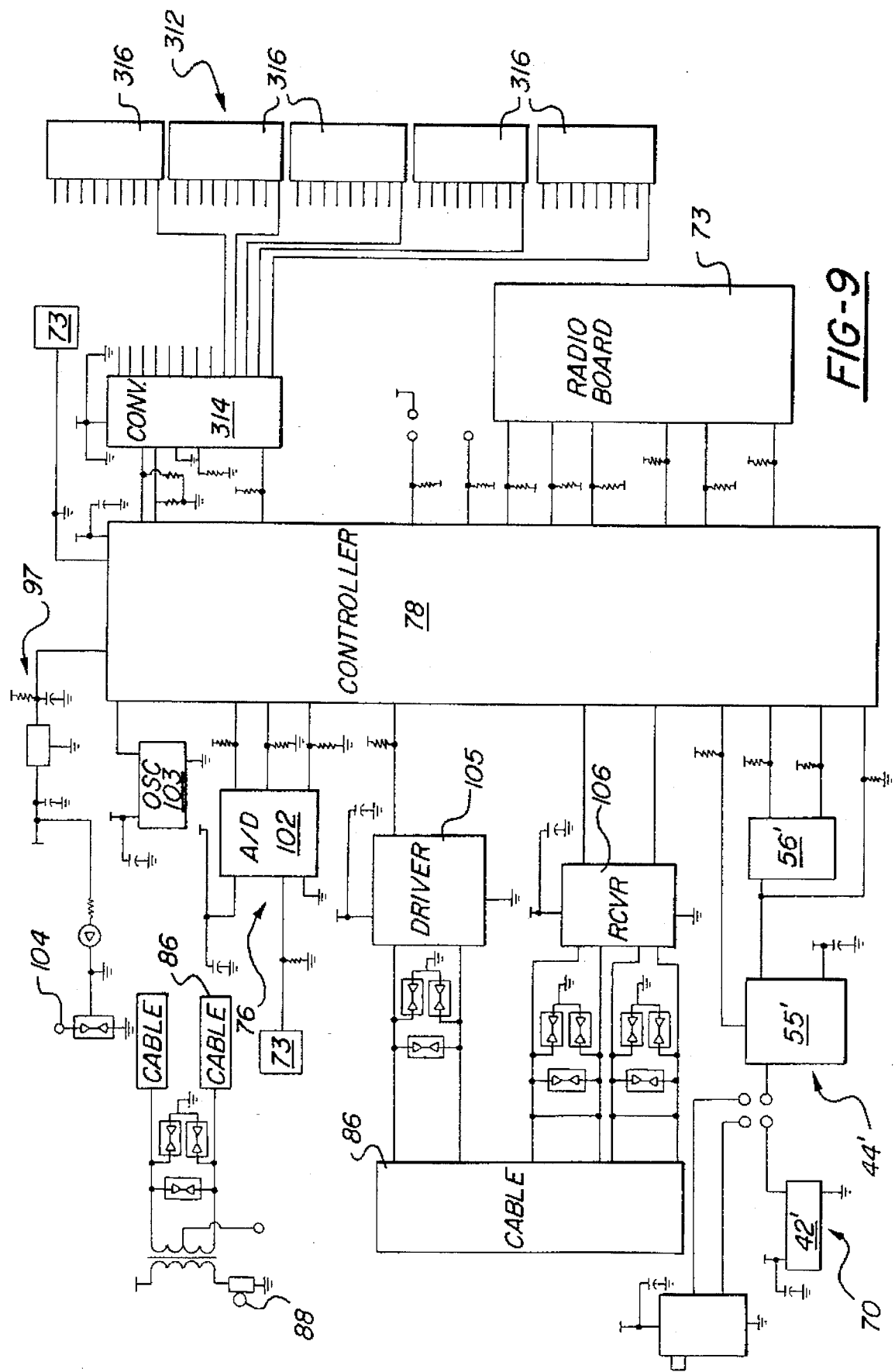
FIG. 9 is a circuit diagram of the transceiver timer.
Figure 10A:
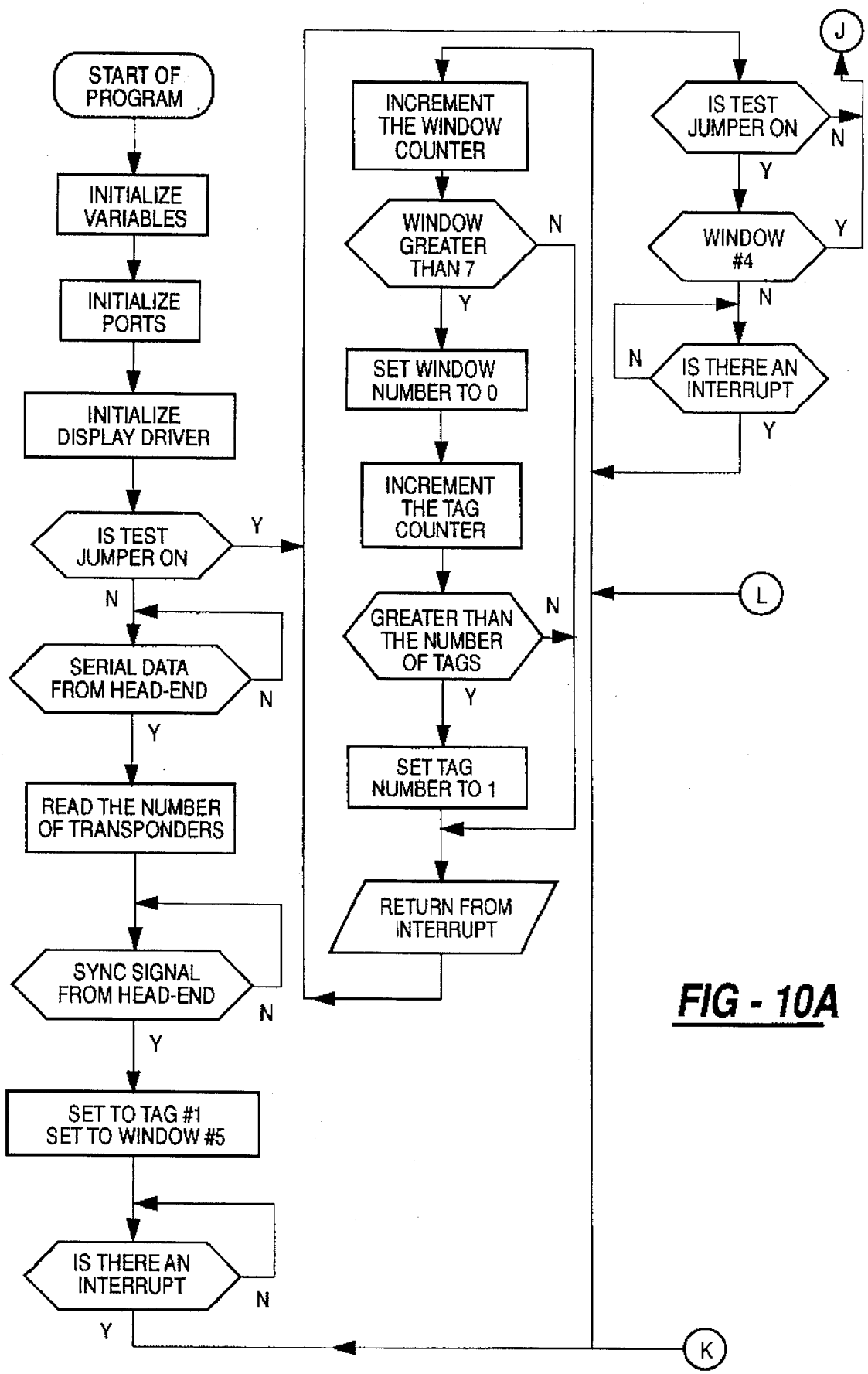
FIG. 10 is a flow chart of the transceiver processor.
Figure 10B:
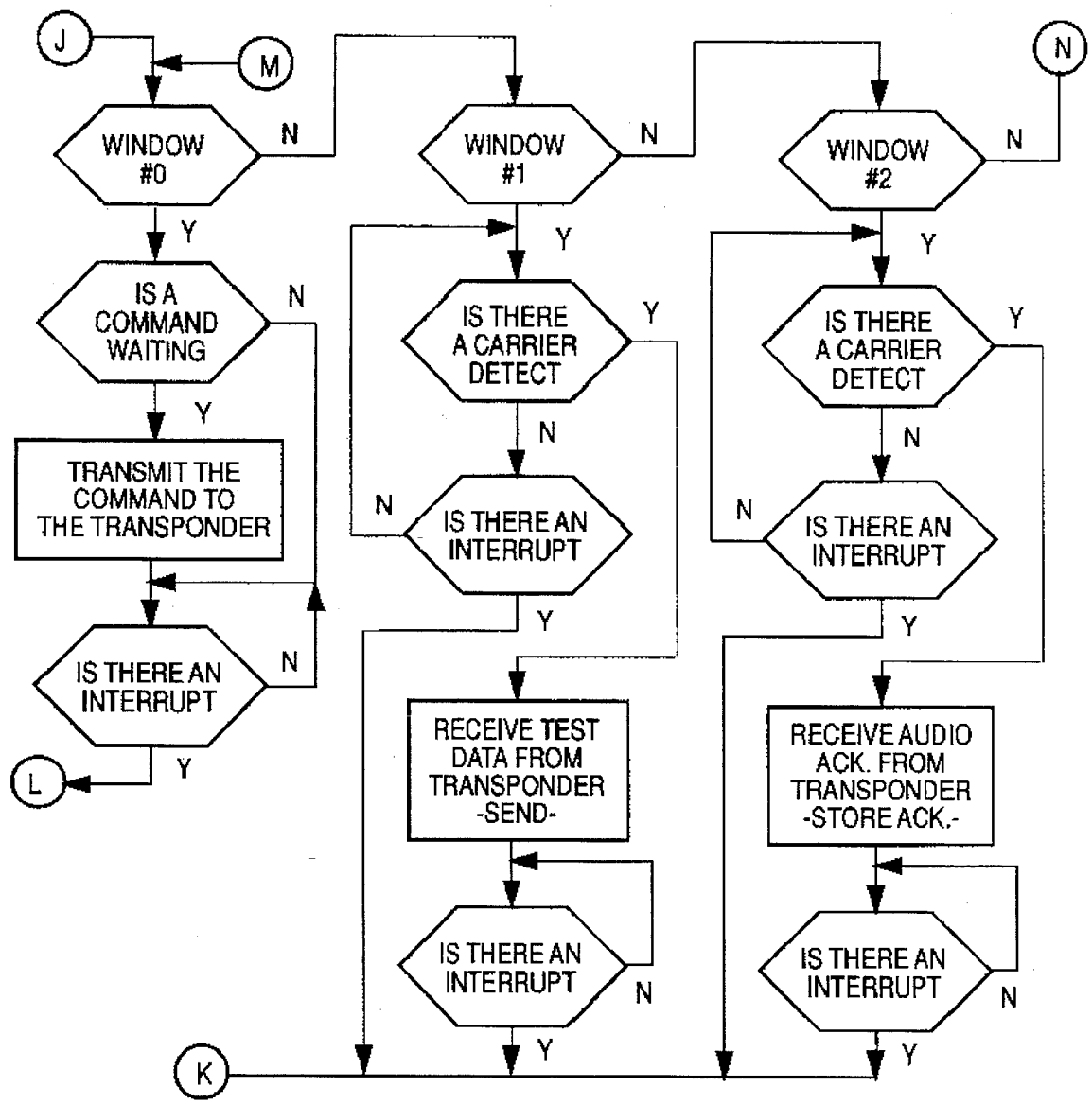
Figure 10C:
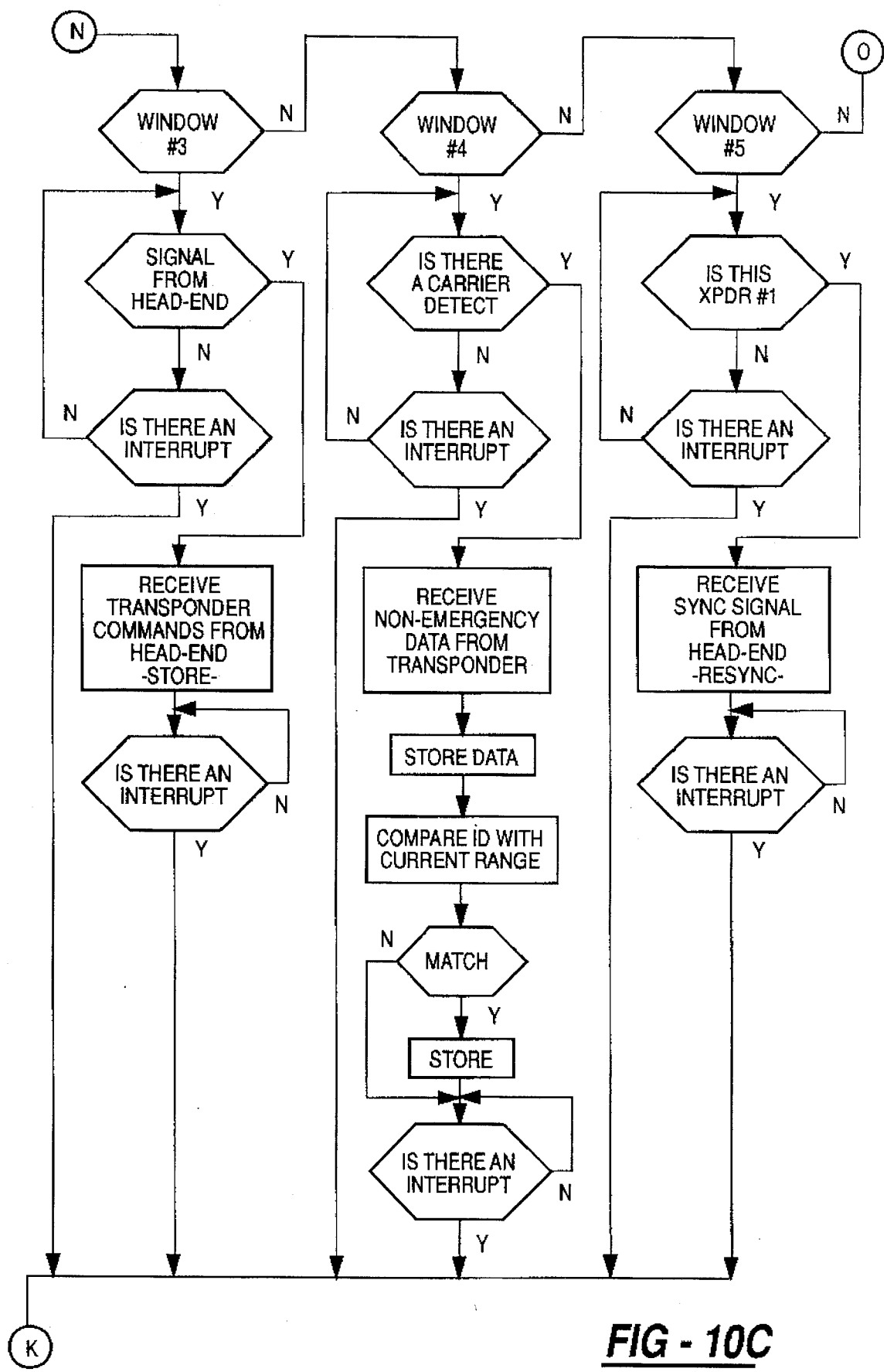
Figure 10D:
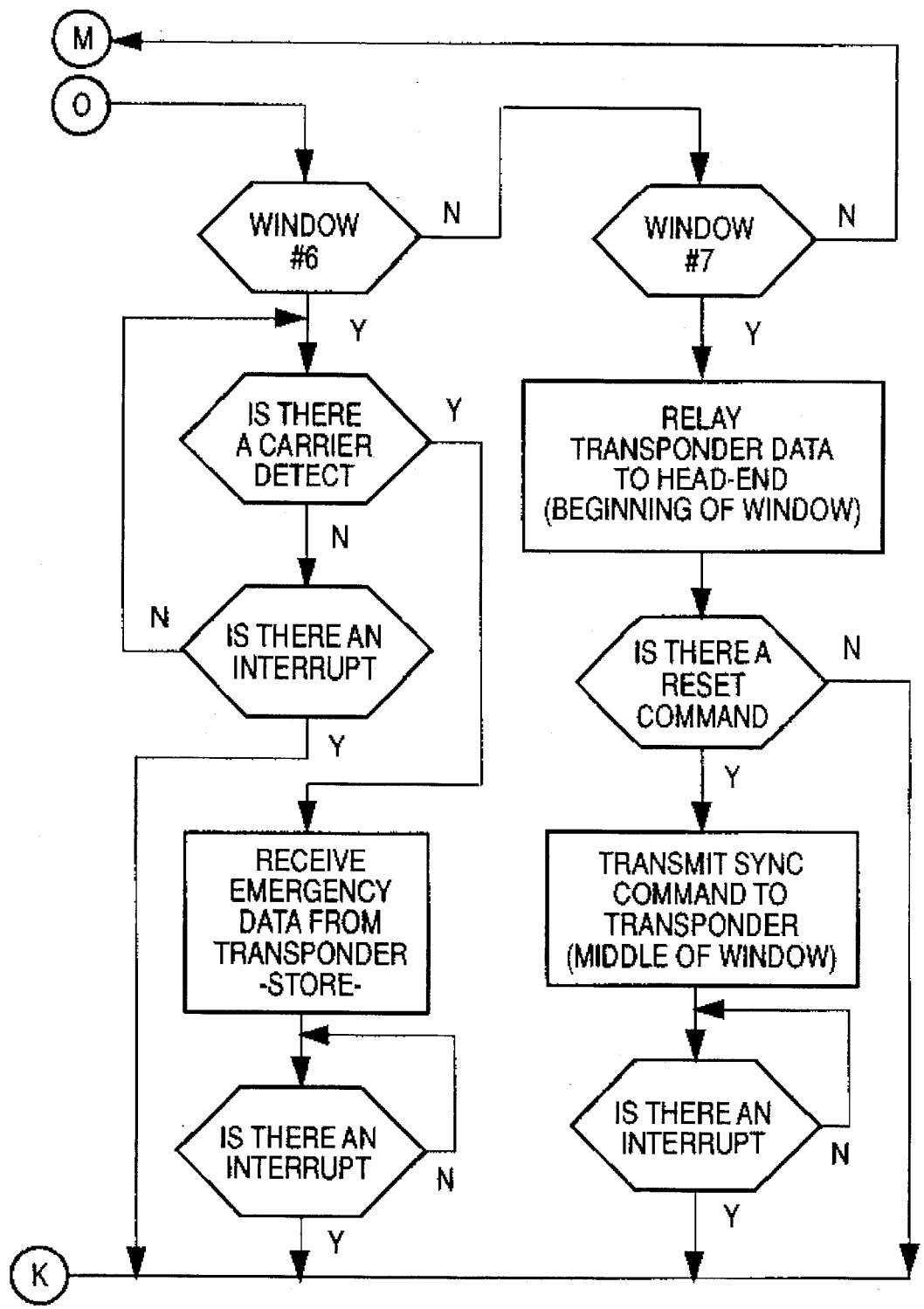
Figure 11A:
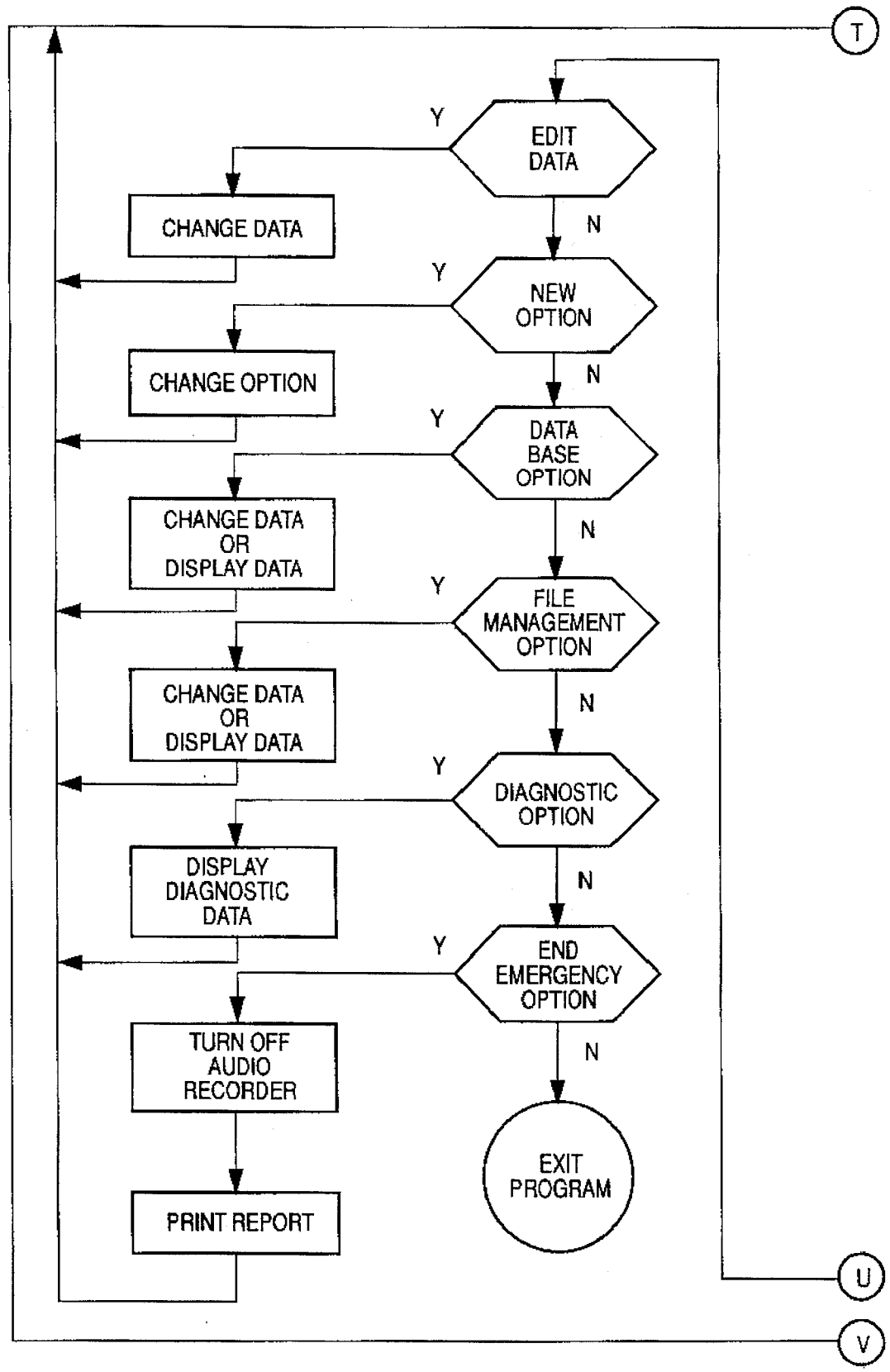
FIG. 11 is a flow chart of the main controller means.
Figure 11B:
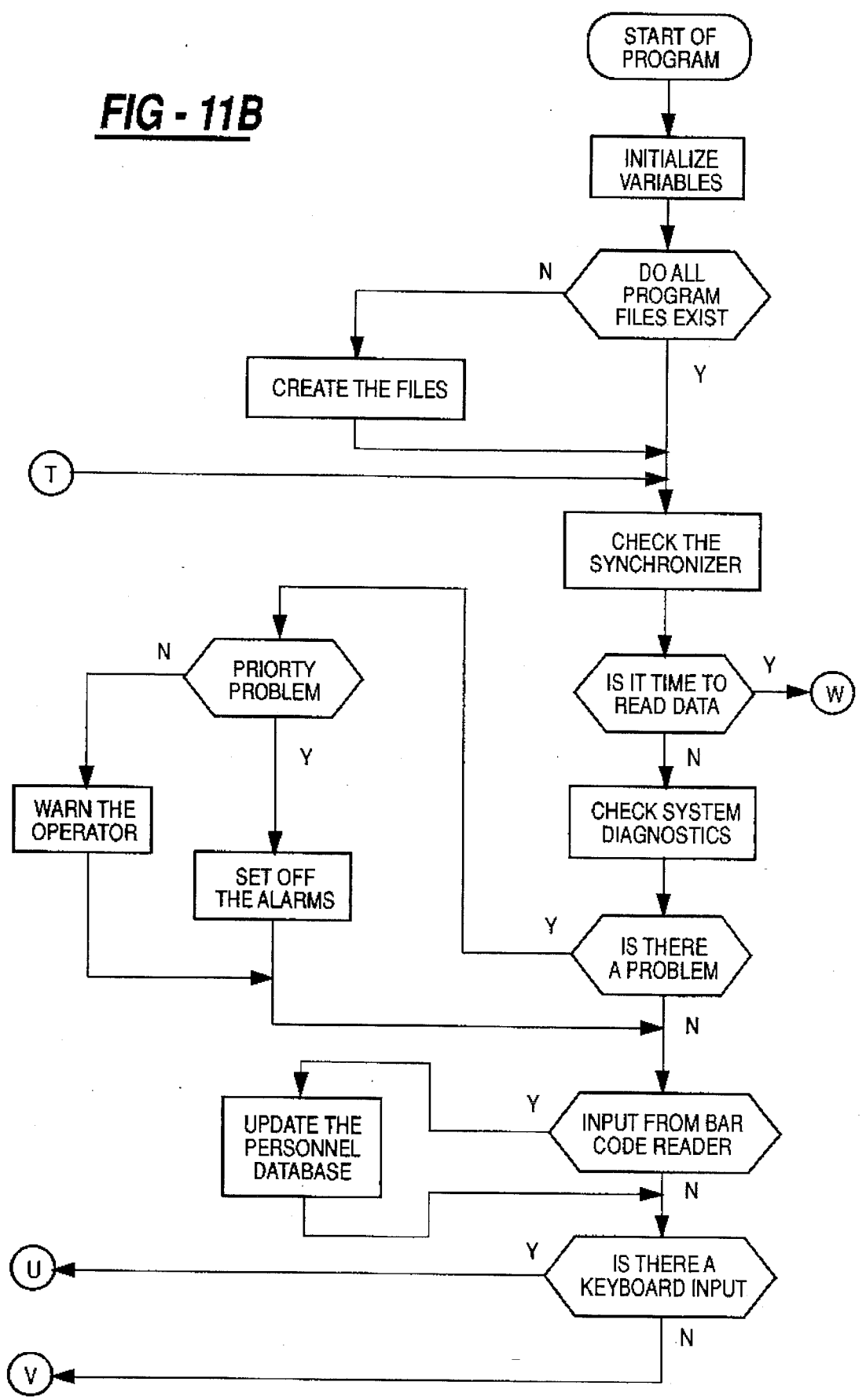
Figure 11C:
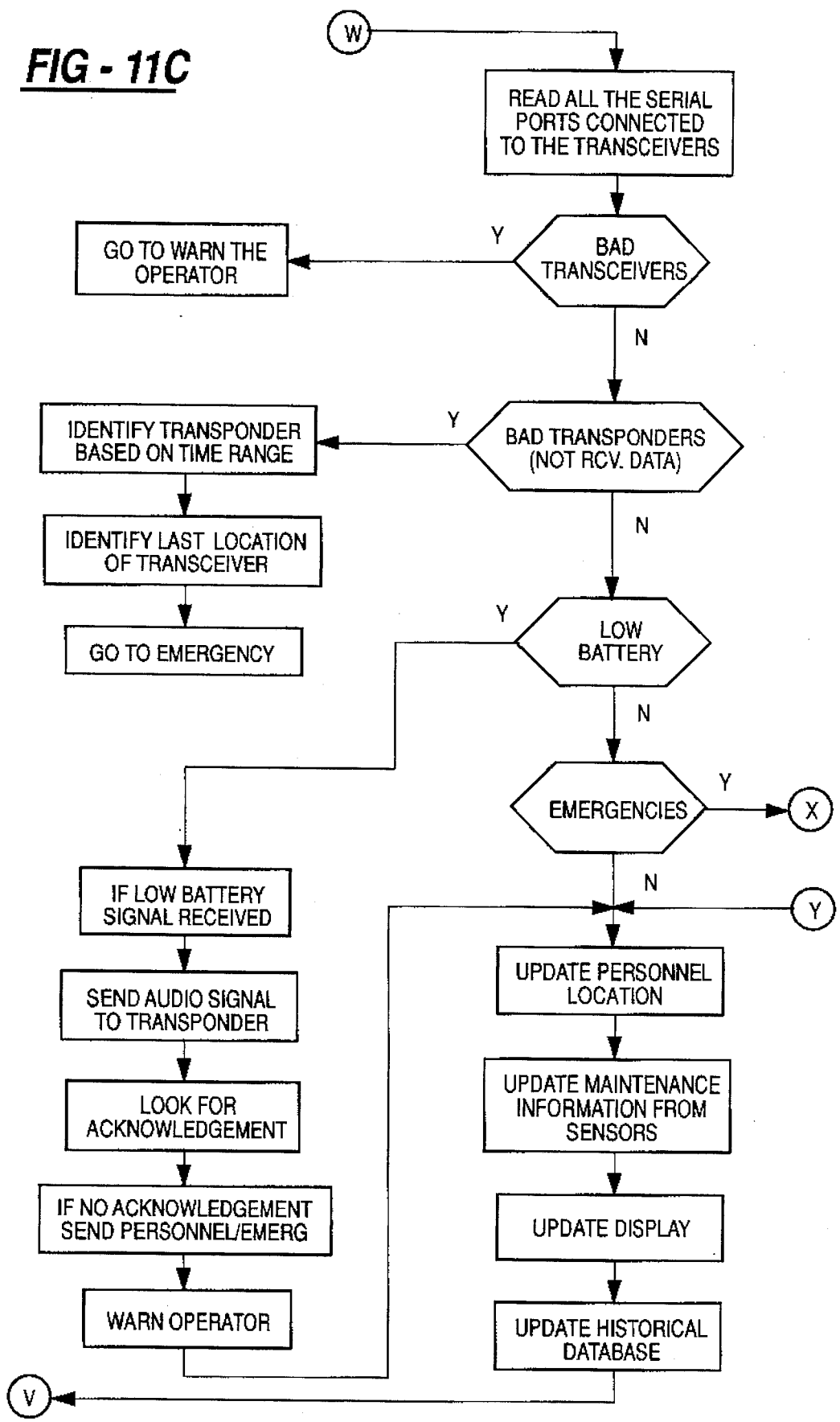
Figure 11D:
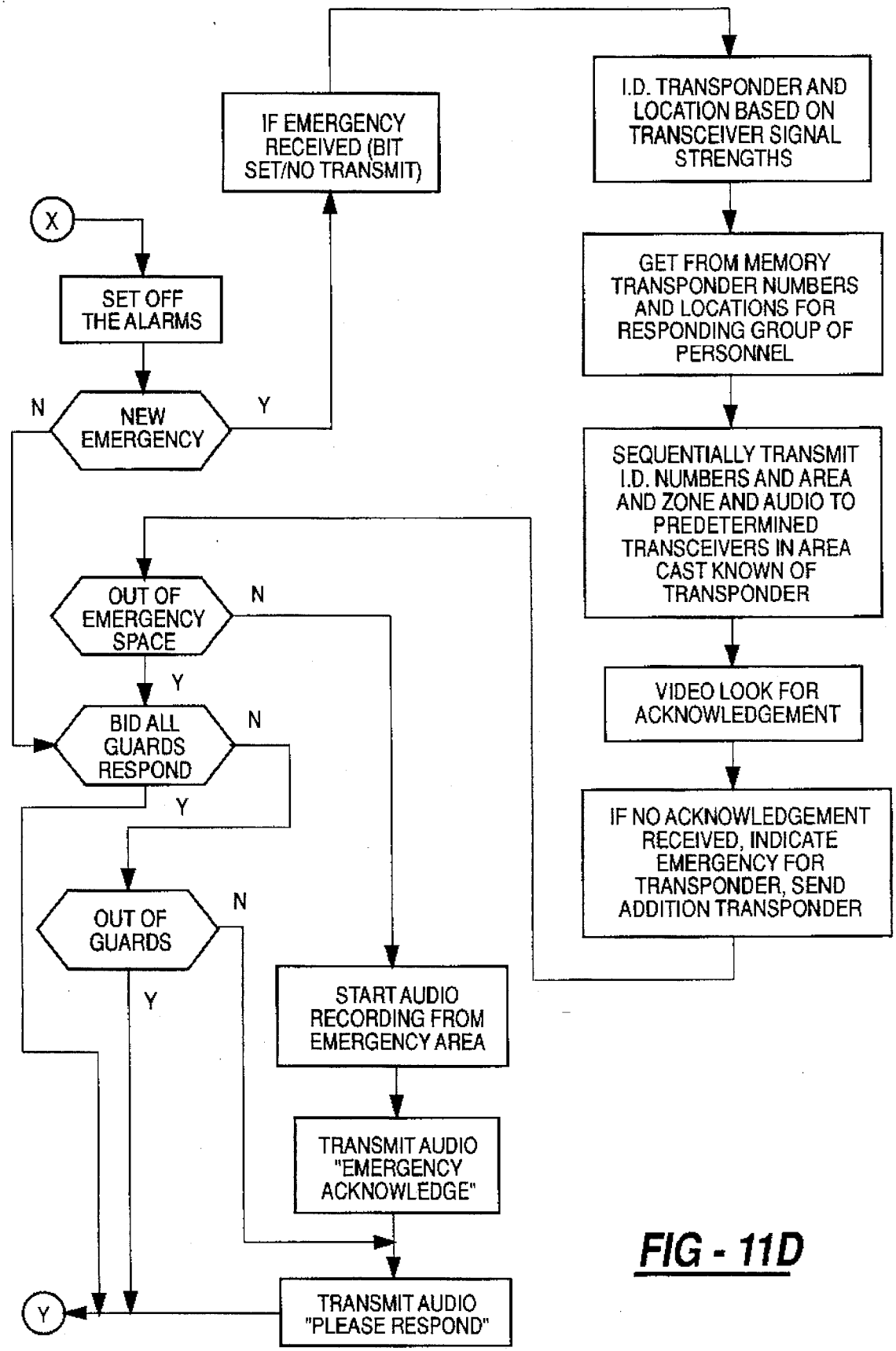

The specific circuitry of the transceivers 16 is illustrated in FIG. 9. The timing means 70 is configured the same as the transponder timing means 40 and includes primed reference numerals corresponding thereto. The controller 78 comprises a microcomputer of the type MC68HC705C8. The radio board 73 is generally of the type 900 MHz FSK link. The radio board 73, as in the transponder, includes the r.f. transmitter 72 and the r.f. receiver 74. The transmitter 72 receives the command signal from the controller 78, and also a power control signal to control powering thereof. Signals communicated to the radio board 73 from the controller 78 include: start of packet, request to send, transmit mode (0=receive, 1=send), data out. Signals communicated from the radio board 73 include: carrier detect, data in, along with the signal strength. The r.f. receiver 74 within the radio board 73 produces a received data signal. The receiver 74 produces a carrier detect signal to the controller 78 indicating reception of the r.f. signal.

The measuring means 76 includes an analog to digital converter 102 for receiving the analog signal strength from the radio board 73 and producing a digital representative thereof to the controller 78. The analog to digital converter 102 is of the type ADC0831.

A controller timer 103 is connected to the controller 78 and is crystal controlled for establishing the controller clock. Power supply from the central controller 20 is separately hardwired directly to each transceiver 16 and is received at line 104, and connected through a reset circuit 97 including a voltage regulator to the controller 78.

A driver 105 is connected to the controller 78 to receive the status signals and communicate same along the cable 86 to the central controller 20. The driver 105 is of the type AM26L831 (RS422 Driver). A cable receiver 106 receives the serial command signal from the central controller 20 on the RS422 cable 86, and receives the sync signal directly from the synchronizer 120, as subsequently discussed. The cable receiver 106 communicates the received signal to the controller 78.

The transceiver 16 also includes a microphone 88 (FIG. 2) attached thereto and independently hardwired to the central controller 20 for monitoring emergency conditions and transmitting same to the central controller 20. Alternatively or in addition thereto, a video camera may be connected to allow visual monitoring of the emergency when it arises.

The transceivers 16 also include display means 312 for displaying information, such as current transponder number or time range and signal strength. Other variables may be displayed as desired. The display means 312 comprises a serial to parallel converter/driver 314 connected to five 7-segment displays (type MAN74 A) 316 to display five digits representing the information.

Figure 2:
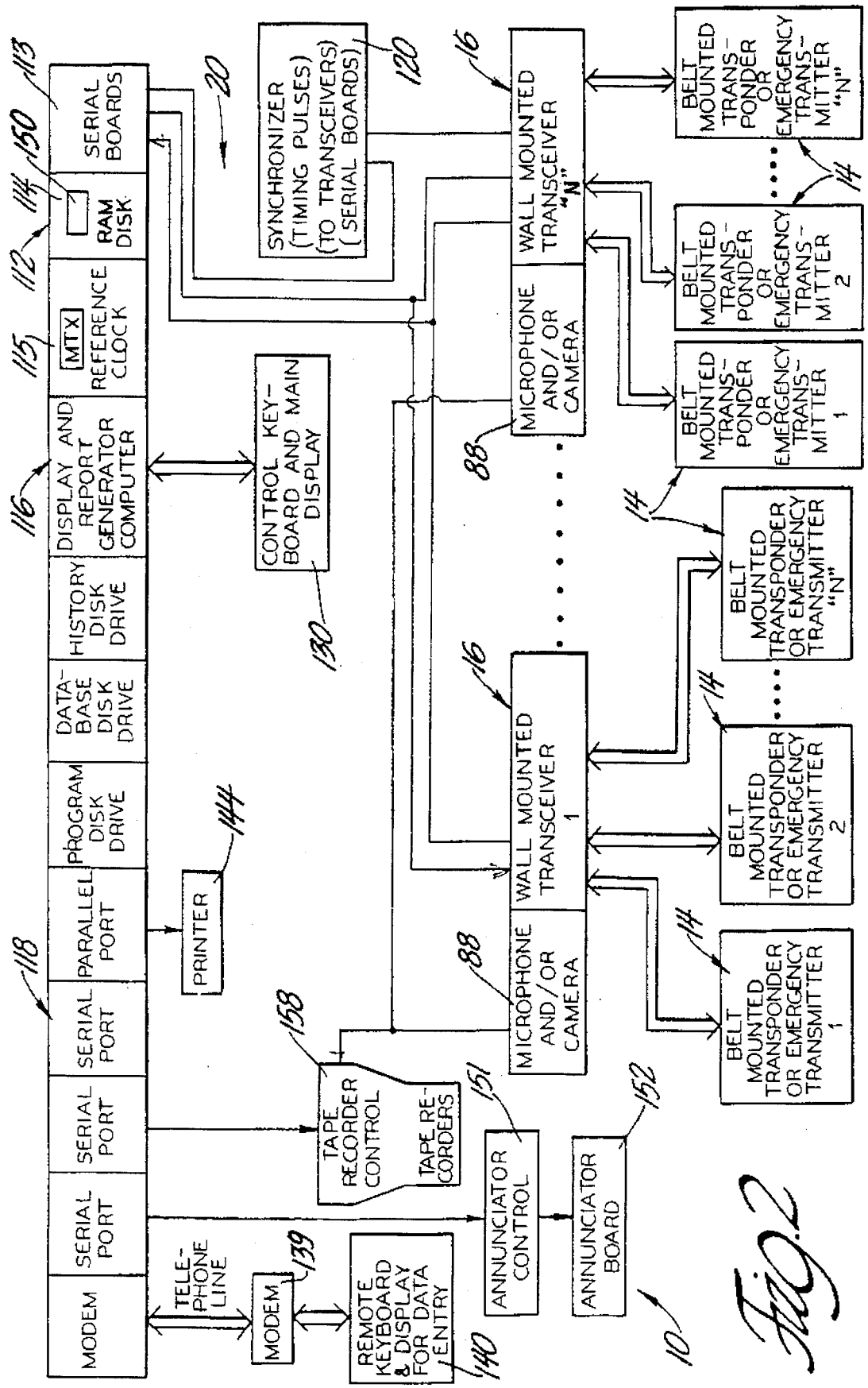
FIG. 2 is a block diagram of the subject invention.

The central multitasking controller 20 is generally illustrated in FIG. 2 and includes a serial controller or computer 112 with RAM disk 114, display and report generating software as means 116, data base and history generating software as means 118, and synchronizer means or circuit 120. It should be understood that a single computer may be utilized to implement the functions described. The computers operate as a whole under the flow chart illustrated in FIG. 11.

The information signal from each transceiver 16 is sent to the serial controller 112 through serial boards 113 and all information is stored in the RAM disk 114. The information from each transceiver 16 is connected and collected in parallel. The serial controller 112 handles in real time all received signal strengths from the transceivers 16 based on internal clock 115, tracks the location of transponders 14, and accomplishes the voting based on signal strength. The serial controller 112 is synchronized with the transceivers 16 and transponders 14 by the synchronizer 120. The serial controller 112 includes a matrix memory 122 in the RAM 114 for storing the available locations of each transponder 14 with identification number and associated sequence time range with respect to each transceiver 16 to detect spurious readings and/or improper operation of a particular transponder 14. A bit of 0 indicates a location not valid and a bit of 1 indicates valid location. The form of the memory 122 is illustrated in FIG. 12a.

The serial computer 112 examines the matrix 122 and sees if any transponder 14 is out of place. The serial controller 112 eliminates spurious readings. The RAM 114 stores information for one cycle. Upon the second cycle, the serial controller 112 makes sure that the signal is relatively consistent and there is not spurious data.

Each of the transceivers 16 are hardwired to the data serial board 113, which board is polled by the serial controller 112. The serial controller 112 associates or places a transceiver identification number at each port on the data board 113 for identifying the transceiver 16 and therefore its location. The serial controller 112 polls each line to determine, during a single time range, which transceiver 16 has transmitted an information signal indicating that the transceiver 16 had received a data signal. Each of these information are stored in a separate buffer 150 categorized with each particular transponder 14 with the transceiver number identified therewith and information transmitted thereby until after reception of a second information signal during the next cycle. If a second information signal is received from the same transceiver 16 the serial controller 112 compares all of the information signal with,respect to their signal strength, and stores the transceiver identification number, along with its information on its RAM disk 114 based on the transponder identification number based on the stronger signal strength. This information is transmitted to the history data base and history means 118 and display and report generator means 116 upon verification after two cycles.

If during a time range, no information is received, the serial controller 112 determines the identification number of the non-transmitting transponder 14 based on its real time clock and synchronization with the transceivers 16. The serial controller 112 transmits this information to the display and report generator means 116. For example, during time range 1, the serial controller 112 knows that a transponder 14 has been assigned the time range 1. Therefore, if no data signal is received during that time, a problem or emergency is detected and acted upon unless the transponder is indicated as out of services or off duty.

When a transceiver 16 transmits an emergency information signal or absence of any transmission, the serial controller 112 identifies the identity of the transceiver 16 and transmits this information to the display and report generator means 0116 notifying such of an emergency condition and the location thereof based on the transceiver 16.

When an emergency signal is received, the serial controller 112 obtains a predetermined number of transponders 14, i.e., fifteen, by identification number. This information is provided in memory 156 (FIG. 12a). Upon obtaining this, the serial controller 112 transmits the audio code bit and zone and area code of the emergency to each selected transponder 14 during sequential time ranges via transceivers 16. The serial controller 112 selects the sequence of transceivers 16 to transmit the response information to the transponders 14 identified with the team. The controller 112 sequences through each transceiver 16 in the prescribed sequence or order such that no transmissions therefrom overlap and areas closest to the emergency transponder 14 are contacted first. The transponder numbers associated with the team are transmitted at each transceiver 16 until all of the team member transponders have acknowledged. The serial controller 112 looks for the audio acknowledge bits in return in subsequent time ranges. The serial controller 112 includes area memory 154 for storing the possible areas and zone codes, which can be associated with the location of the emergency signal to direct the other personnel to the location, along with transceiver priority sequences dependent on location of emergency, and transponder teams.

The display and report generator means 116 communicates with a control keyboard and main display screen 130. The report means 116 drives the display screen 130 for system operation. The screen 130 displays the topology of the structure or facility 18 and the location of each transponder 14 (zone/area) while highlighting emergencies of any transponder 14 by red color coding. The report generator means 116 develops management reports of emergency incidents, location, time, time of inception and time of cancellation.

The topology of the structure for a facility 18 is stored in graphics memory 154 of the display/report generator means 116 (FIG. 12b) wherein the fixed location of each transceiver 16 is stored in location memory 156 and associated by identification number. When an emergency is detected, the display screen 130 may visually display the general location of the transceiver 16 which receives the strongest signal strength, i.e., by red color or blinking action. During an emergency, the display and report generator means 116 turns on tape recorders 158 which are connected to the microphone 88 located in the general vicinity of the emergency. The tape recorders 158 will remain on until the emergency has been eliminated. The display and generator means 116 may continuously display the movement and location of each transponder 14 on the display screen 130. The display/report generator means 116 receives each update of transponder 14 location from the serial controller 112 in order to update any change in position based on change in signal strength or change in transceiver 16, or an update on status thereof to emergency.

The database and history means 118 may communicate through a modem 139 to a remote keyboard and display 140 for data entry. The keyboard and display 140 is utilized for inputting transponder 14 assignments to personnel 12, e.g., transponder identification number versus personnel identity, and other system variables in an identification memory 160 (FIG. 12c).

The database and history means 118 stores the information and performs archival in a history memory 162. The archival function includes the recordal of the specific events occurring with an emergency, i.e., when, where, who and the number of responses, etc. Such information includes which transponder 14 and personnel initiated the emergency, date and time of an emergency, position of personnel or guards, and diagnostic equipment problems as illustrated in FIG. 12c a printer 144 prints out all information upon request by the remote keyboard 140.

The serial boards 113 also act as buffered boards for dumping the command signal to selected transceivers 16.

The controller 20 determines which transceivers 16 should receive a command signal for a specific transponder 14 based on the last known location of the transponder 14 and ensures that no transceiver 16 overlaps it r.f. transmission ranges. Furthermore, this "mapping" occurs for transmission of the sync signal. Only selected ones of the transceivers 16 receive the sync command signal at a given time, and will in turn transmit same to transponders 14 within r.f. range. More than one transceiver 16 may transmit the sync signal when located in remote areas not within each other's transceiver's r.f. range. The mapping function designates sets of transceivers 16 which may transmit at the same time without interference as controlled by the serial controller 112.

An annunciator control 151 and annunciator board 152 may be used in conjunction with the assembly 10. The annunciator control 150 and board 152 are commonly used in present prison systems, and may be more accurately utilized with the central controller 20 to indicate location and emergency, controlled by the database/history generating means 118.

The flow chart for the central controller 20 is illustrated in FIG. 11. The variables are initialized, and a check occurs to determine if all program files exist. The synchronizer is checked to determine timing position, i.e., functions occurring. If it is time to read the data during the middle of window #7, all the serial ports connected to the transceivers 16 are read. After each time range as indicated by the synchronizer 120 (window #7), the central controller 20 looks for the status signals at each transceiver inputs. If no signals are received, the central controller 20 determines which transponder 14 is associated with the time range by memory 122, and the last location thereof by memory 150 and stored history. If a bad transceiver 16 or transponder 14 is determined, the operator is warned. The operator is also warned if a low battery is detected. The display 130 flashes an indication of bad transceiver or transponder or low battery, or emergency. If status signals are received, the transponder information including transceiver identification are stored in memory 150 and compared to a second cycle of received information to ensure a spurious reading was not received. If emergencies exist, the program branches to the emergency subroutine. The location is determined by the transceiver 16 with the greatest signal strength. Alternatively, the location can be more accurately determined as according to U.S. Pat. No. 4,494,119 to Wimbush, and assigned to the assignee of the subject application. The location and information thereafter updates the history computer 118 maintenance information from the sensors is updated. The main display 130 and annunciator 132 are updated to indicate visual position.

If an emergency exists for a specified transponder 14, the location of the transponder 14 is determined based on the most recent signal in history and stored. It is determined if it is a new or existing emergency. If it is not new, it is determined if all requested guards responded. If all guards did not respond, it is determined if there are remaining guards available. If so, the audio signal to "RESPOND" is transmitted to the available guards. If it is a new emergency, it is first determined if it is out of emergency space in audio recording. If not, audio recording from the emergency area is initiated. The audio signal is transmitted to selective transponders 14 to respond to the emergency. The responding emergency unit is obtained from memory 156 which obtains the transponder identification numbers of those personnel responding to the emergency. The central controller 20 determines the last known location of each transponder 14 and transmits the command signal indicating emergency and specifying each transponder concurrently or sequentially, depending on the location of each transponder 14. The central controller 20 identifies which transceivers 16 are in an area of the transponder 14 by memory 150 and can instruct only those transceivers 16 to transmit the command signal to the selected transponder 14. Concurrently, a different set of transceivers 16 out of range of the former set, may transmit the emergency command signal to another selected transponder 14. Transponders 14 who may overlap ranges of a similar transmitting transceiver 16 are sent command signals sequentially during sequential time ranges. Thereafter, audio acknowledges for each transponder 14 are expected.

If it is not time to read the data, the system diagnostics are checked. If there is a problem with the diagnostics, it is determined if the priority problem exists, and if so, alarms are set. If a priority problem does not exist, the operator is warned. For example, if disk space is becoming scarce, a non-priority warning is given, but if a low battery is detected a priority level warning is given.

If no problem exists or alarms set, input from the bar code reader is checked. If input is being received, the personnel data base is updated appropriately. Information read through the bar code reader includes badge number, name, etc. of personnel logging in.

Thereafter, it is determined if there is a keyboard input. If not, the routine continues to checking the synchronizer step.

If there is a key board 140 input, the following occurs. The key board input allows data to be edited, new options to be entered, data base options to be changed or displayed, file management options to be changed or displayed, diagnostic options to be displayed, and emergency option in order to turn off audio records and printer reports. Such input and editing includes using passwords for access to various editing levels, additions or deletions to active transceivers, designated response teams may be altered.

The synchronizer means 120 is located at the central controller 20 providing synchronizing thereof. It provides the synchronization signals to the transceivers 16 and nest 31. The sync signal transmitted to each transponder 14 includes the total number of active transponders 14 and the current transponder number. The synchronizer 120 further establishes the selection and sequence of transmission to the transceivers 16 of the command signals such that subsequent r.f. interference from transmission by the transceivers 16 does not occur. The synchronizer means 120 comprises a simple clock and produces a synchronizing signal periodically to update the central controller 20, transceivers 16 and transponders 14. The general flow chart of the synchronizer 120 is illustrated in FIG. 13.

The circuit diagram for the synchronizer 120 is illustrated in FIG. 14. The synchronizer 120 includes a programmable logic controller 340 for providing the main synchronizer control. Timing means 342 is provided by a crystal controlled oscillator 344. The timing means 342 of the synchronizer 120 is the same as the timing means of the transponders 14 and transceivers 16. The controller 340 provides a synchronizing signal output which is connected to all of the transceivers 16 trough driver 346 to cabling 348 connected to each transceiver 16. This is the actual timed sync signal; the main controller 20 send out a sync signal first to notify the transceivers 16 of the subsequent sync signal. Also provided is a clear to send signal to all of the data boards 113 at the central controller 20 through driver 350 and cabling 352 to initiate dumping of information to the transceivers 16. Digital display is accomplished by 7-segment displays 354 and serial-to-parallel converter 356 for displaying information, such as current transponder number or time range, current window. The controller 340 clock is set by oscillator 356. A watchdog timer 358 for resetting the controller 340 is included as in the transponder 14 and transceiver 16. Serial data from the controller 340 is sent to the data boards 113 through driver 360 and cable 362. Data is received from the main controller 20 by cable 364 and driver 368.

The timing diagram for the synchronizer is also illustrated in FIG. 7. As with the transceivers 16 and transponders 14, a middle of window signal and a start of window signal is produced for each window #0–7. The synchronizing signal to the main controller 20 is produced during window #3. The synchronizing signal transmitted to the transceivers is produced during window #5. The current transponder number is transmitted to the main controller 20 during window #7.

The flow chart of the synchronizer is illustrated in FIG. 13. At the start of the program, the variables, ports and display driver are initialized. Thereafter, serial data from the main controller 20 are awaited. Once received, the number of transponders is read. The transponder number is set to 1 and the window is set to #0. Thereafter, an interrupt is awaited. Once an interrupt is received, various functions occur during windows #0–7. During window #0, the current transponder number may be sent to a simulator (not shown) if used during the beginning of the window. During windows #1 and 3, nothing occurs and an interrupt is awaited. During window #3, the clear-to-send signal is sent to the boards 113 at the main controller 20. During window #4, nothing occurs and an interrupt is waited. During window #5, it is determined if transponder number #1 is indicated, and if so, the sync signal is sent to the transceivers 16. During window #6, nothing occurs and an interrupt is awaited. During window #7, the current transponder number is sent to the central controller means 20.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A communication system, said system comprising:

a plurality of transponder means (14) for transmitting a data signal at a first predefined time and receiving a command signal containing information and a sync signal;

transceiver means (16) for receiving said data signal and for producing an information signal indicative of said transponder means (14) transmitting said data signal at a second predefined time;

central controller means (20) for receiving said information signal at a third predefined time and for identifying said transponder means (14) and location of said transceiver means (16) based; and said head controller means (20) including synchronizing means (120) for producing a synchronization signal and for selectively transmitting said synchronization signal to said transceivers (16) for synchronization thereof said predefined times.

2. A system as set forth in claim 1 further characterized by said transceiver means (16) including resynchronizing means for receiving said synchronization signal and for resetting said predefined time.

3. A system as set forth in claim 2 further characterized by including a plurality of transceiver means (16), said central controller means (20) including means for selecting at least one of said transceiver means to receive transmission of said synchronizing signal.

4. A system as set forth in claim 3 further characterized by said transceiver means (16) including transmission means for retransmitting said synchronization signal to said transponder means (14).

5. A system as set forth in claim 4 further characterized by said transponder means (14) including sync receiving means for receiving said synchronization signal and for resynchronizing said first predefined time.

6. A system as set forth in claim 5 further characterized by said synchronization signal including an identification number representative of a specific transponder means.

7. A system as set forth in claim 6 further characterized by each of said transponder means (14) including timing means (40) for establishing cycles of sequential time ranges wherein each time range is associated with each of said transponder means (14) and occurs at least once during each cycle, said identification number identifying which of said transponder means (14) is associated with the time range transmission of said synchronization system for resynchronizing said transceiver means and transponder means to the appropriate time range.

8. A system as set forth in claim 7 further characterized by said timing means (40) including divider means (40) for dividing each of said time ranges into at least two time windows for allowing reception of said command signal during one of said time windows by said transponder means (14) and for allowing transmission of said data signal during the other of said time windows by said transponder means (14) associated with said time range during each cycle, said resynchronization signal being sent during a specifying time window for resynchronization at that time.

9. A system as set forth in claim 8 further characterized by said central controller means (20) including mapping means for selecting more than one transceiver means (16) for producing of said resynchronization signal so that r.f. transmission will not overlap other transmitting transceiver means (16).

10. A monitoring system, said system comprising:

a plurality of transponder means (14) for transmitting a data signal including an emergency condition;

transceiver means (16) for receiving said data signal and identifying which of said plurality of transponder means (14) is transmitting;

each of said transponder means (14) including timing means (14) for establishing cycles of sequential time ranges wherein each time range is associated with each of said transponder means (14) and occurs at least once during each cycle, said data signal being transmitted during the time range associated with a respective transponder means (14); and said transponder means (14) including emergency means for transmitting said data signal with emergency condition during any of said time ranges.

11. A system as set forth in claim 12 wherein said timing means (40) includes divider means for dividing each of said time ranges into at least two time windows for allowing transmission of said data signal without emergency condition during one of said time window by said transponder means (14) associated with said time range during a cycle, and for allowing transmission of said data signal with emergency condition during the other of said time windows by said transponder means (14) during any time range upon detection of the emergency condition.

12. A monitoring system, said system comprising:

a plurality of transponder means (14) for transmitting a data signal and receiving a command signal;

a plurality of transceiver means (16) for receiving said data signal and for producing an information signal indicative of the transponder means (14) which is transmitting;

central controller means (20) for receiving said information signal and for identifying the location of said transponder means (14), and for detecting an emergency condition from said data signal and for automatically notifying by transmission of said command signal a selected transponder means (14) the occurrence of the emergency signal.

13. A monitoring assembly, said assembly comprising:

a plurality of transponder means (14) for transmitting a data signal and receiving a command signal;

transceiver means (16) for receiving said data signal and producing an information signal that identifies which of said plurality of transponder means (14) is transmitting:

control means (20) for receiving said information signal and for displaying the location of the transponder means (14);

said controller means (20) including means for selecting less than all of said transceiver means (16) and for transmitting said command signal to said less than all of transceiver means (16) for subsequent transmission for reception by said transponder means (14).

14. A monitoring assembly, said assembly comprising:

a plurality of transponder means (14) for transmitting a data signal and receiving a command signal;

transceiver means (16) for receiving said data signal and producing an information signal that identifies which of said plurality of transponder means (14) is transmitting:

control means (20) for receiving said information signal and for displaying the location of the transponder means (14);

said transponder means (14) and said transceiver means (16) including radio frequency transmitters for communicating said data signal and said command signal therebetween.

15. An assembly as set forth in claim 14 wherein each of said transponder means (14) includes timing means (40) for establishing cycles of sequential time ranges wherein each time range is associated with each of said transponder means (14) and occurs at least once during each cycle, said timing means (40) including divider means (40) for dividing each of said time ranges into at least two time windows for allowing reception of said command signal during one of said time windows by said transponder means (14) range and for allowing transmission of said data signal during the other of said time windows by said transponder means (14) associated with said time range during each cycle.

16. An assembly as set forth in claim 15 further characterized by said timing means (40) including clock means (42) for generating a clock signal.

17. An assembly as set forth in claim 16 further characterized by said timing means (40) including total buffer (39) for storing the total number of transponder means (14) in said assembly, and an identifier buffer (35) for storing the sequence number identified with one of said total number associated with said transponder means (14).

18. An assembly as set forth in claim 17 further characterized by said divider means (44) including window means (44) for receiving said clock signal and for dividing said clock signal into said time windows producing a window signal at the start of each of said time windows.

19. An assembly as set forth in claim 18 further characterized by said transponder means (14) including transmitter means (36) for receiving said data signal and transmitting same over radio frequencies and receiver means (52) for receiving said command signal over a radio frequency link.

20. An assembly as set forth in claim 19 further characterized by said transponder (14) including emergency switch means (24) for manual actuation to produce an emergency signal in response thereto.

21. An assembly as set forth in claim 20 further characterized by said transponder means (14) including separation means (26) for sensing separation of said transponder means and for producing a separation signal in response thereto.

22. An assembly as set forth in claim 21 further characterized by said transponder means (14) including a battery supply means (28) for maintaining a charge and supplying power, and including battery sensor means (32) for sensing charge on said battery supply means (28) and for producing a battery signal when said charge falls below a predetermined magnitude.

23. An assembly as set forth in claim 22 further characterized by said transponder means (14) including controller means for producing said data signal based on said emergency signal and said sequence number and for communicating said data signal to said transmitter means (36) upon reception of said window signal, said controller means (34) including coding means for receiving said emergency signal and said battery signal and said separation signal for producing said data signal in the form of binary coding.

24. An assembly as set forth in claim 23 further characterized by said controller means (34) including range counter means (41) for receiving a total number signal and for counting the window signals to indicate a number representative of the current time range.

25. An assembly as set forth in claim 24 further characterized by said controller means (34) including window counter means (43) for receiving said window signals and for counting to indicate the sequence number of the current window.

26. An assembly as set forth in claim 25 further characterized by said controller means (34) including means for comparing the transponder sequence number with the current sequence number if equivalent to allow transmission of said data signal during a first predetermined window.

27. An assembly as set forth in claim 26 further characterized by said controller means (34) including means for allowing transmission of an emergency signal by any transponder during a second predetermined window in response to said emergency signal.

28. An assembly as set forth in claim 27 further characterized by said transponder means (14) including audio transducer means (50) for receiving an audio signal and producing audible communication.

29. An assembly as set forth in claim 28 further characterized by said transceiver means (16) including timing means (70) for establishing sequential time ranges synchronized with said transponder means (14), said timing means (80) including oscillator means for producing a clock signal and window means for producing a window signal upon the start of each window synchronized with said transponder means (14).

30. An assembly as set forth in claim 29 further characterized by said transceiver means (16) including receiver means for receiving said data signal.

31. An assembly as set forth in claim 30 further characterized by said transceiver means (16) including analog to digital converter means for receiving said data signal and for measuring the signal strength producing the signal strength signal.

32. An assembly as set forth in claim 31 further characterized by said transceiver means (16) including command transmitter means for transmitting said command signals and said audio signals over radio frequencies to said transponder means (14).

33. An assembly as set forth in claim 32 further characterized by said transceiver means (16) including transceiver processor means including identification memory means for storing said pointer number with an associated identification number of each of said transponder means (14).

34. An assembly as set forth in claim 33 further characterized by said transceiver processor means (94) including command means for receiving an audio command during a predetermined time range and for obtaining said identification number from said identification memory means and for coding said command signal.

35. An assembly as set forth in claim 34 further characterized by said transceiver means (16) including audio sensing means for sensing audible signal in the vicinity of said transceiver means (16) and for producing an audio output.

36. An assembly as set forth in claim 35 further characterized by including control means (20) for receiving said information signal and for displaying the location of said transponder means (14) and for producing said audio command signal.

* * * * *